United States Patent
Quartarone, III

(10) Patent No.: US 11,583,051 B2
(45) Date of Patent: Feb. 21, 2023

(54) ANGLED CHARGING POCKET

(71) Applicant: Samsonite IP Holdings S.a r.l., Luxembourg (LU)

(72) Inventor: Frank Anthony Quartarone, III, Dorchester, MA (US)

(73) Assignee: Samsonite IP Holdings S.a r.l., Luxembourg (LU)

( * ) Notice: Subject to any disclaimer, the term of this patent is extended or adjusted under 35 U.S.C. 154(b) by 614 days.

(21) Appl. No.: 16/271,030

(22) Filed: Feb. 8, 2019

(65) Prior Publication Data
US 2020/0253349 A1    Aug. 13, 2020

(51) Int. Cl.
| | |
|---|---|
| A45C 15/00 | (2006.01) |
| A45C 3/00 | (2006.01) |
| A45C 13/02 | (2006.01) |
| H02J 7/00 | (2006.01) |
| H02J 7/02 | (2016.01) |
| A45F 3/04 | (2006.01) |
| A45F 3/00 | (2006.01) |

(52) U.S. Cl.
CPC ............... *A45C 15/00* (2013.01); *A45C 3/00* (2013.01); *A45C 13/02* (2013.01); *A45F 3/04* (2013.01); *H02J 7/0045* (2013.01); *H02J 7/025* (2013.01); *A45C 2003/008* (2013.01); *A45F 2003/003* (2013.01)

(58) Field of Classification Search
CPC .......... A45C 15/00; A45C 3/00; A45C 13/02; A45C 2003/008; A45F 3/04; A45F 2003/003; H02J 7/0045; H02J 7/025
See application file for complete search history.

(56) References Cited

U.S. PATENT DOCUMENTS

| | | | | |
|---|---|---|---|---|
| 2,299,673 | A * | 10/1942 | Zolkind | A45C 3/00 312/231 |
| 6,193,118 | B1 * | 2/2001 | Kearl | A45C 7/0095 108/43 |
| 7,828,457 | B2 * | 11/2010 | Davidoff | A45C 1/024 362/156 |
| 8,726,952 | B2 * | 5/2014 | Jambunathan | A45C 1/06 150/147 |
| 9,362,777 | B2 | 6/2016 | Lau et al. | |
| 9,461,499 | B2 | 10/2016 | Ormesher et al. | |
| 9,729,003 | B1 | 8/2017 | Chow | |
| 9,735,839 | B2 | 8/2017 | Lin | |
| 9,793,746 | B2 | 10/2017 | Ormesher et al. | |
| 9,854,897 | B1 * | 1/2018 | Pelkey, Jr. | A45F 3/04 |
| 9,918,537 | B2 | 3/2018 | Warther | |

(Continued)

FOREIGN PATENT DOCUMENTS

| | | |
|---|---|---|
| AU | 2013284447 B2 | 9/2016 |
| CA | 2857394 A1 | 7/2015 |

(Continued)

*Primary Examiner* — Tri M Mai
(74) *Attorney, Agent, or Firm* — Dorsey & Whitney LLP

(57) ABSTRACT

An angled wireless charging pocket of a luggage article may include a first cradle arranged to receive and secure at least portions of a power supply, and a second cradle arranged to receive and secure at least portions of a mobile device, the first and second cradles of the pocket aligned at a lower corner and arranged such that the power supply and the mobile device are held and engaged in overlying alignment at the lower corner.

20 Claims, 13 Drawing Sheets

(56) References Cited

U.S. PATENT DOCUMENTS

| | | |
|---|---|---|
| 10,063,086 B2 | 8/2018 | Miller et al. |
| 2015/0173472 A1 | 6/2015 | Gierke et al. |
| 2015/0326044 A1 | 11/2015 | Ashley et al. |
| 2016/0040958 A1 * | 2/2016 | Alcantra .................. A45F 3/06 224/182 |
| 2016/0183653 A1 | 6/2016 | Warther |
| 2016/0190817 A1 | 6/2016 | Hartelt et al. |
| 2016/0322851 A1 | 11/2016 | Yeh et al. |
| 2017/0049205 A1 | 2/2017 | Tekin |
| 2017/0117742 A1 | 4/2017 | Nakhjiri et al. |
| 2017/0188679 A1 | 7/2017 | Jacob et al. |
| 2017/0302099 A1 | 10/2017 | Bolden et al. |
| 2017/0365208 A1 | 12/2017 | Brooks et al. |
| 2018/0213900 A1 | 8/2018 | Shalgi |

FOREIGN PATENT DOCUMENTS

| | | | |
|---|---|---|---|
| CN | 202987422 U | 6/2013 | |
| CN | 103156364 B | 9/2014 | |
| CN | 204378173 U | 6/2015 | |
| CN | 204444584 U | 7/2015 | |
| CN | 103211376 B | 9/2015 | |
| CN | 204670558 U | 9/2015 | |
| CN | 205233719 U | 5/2016 | |
| CN | 205611972 U | 10/2016 | |
| CN | 205696371 U | 11/2016 | |
| CN | 205757771 U | 12/2016 | |
| CN | 104905520 B | 1/2017 | |
| CN | 106263398 A | 1/2017 | |
| CN | 205848937 U | 1/2017 | |
| CN | 206079378 U | 4/2017 | |
| CN | 206261085 U | 6/2017 | |
| CN | 105455365 B | 9/2017 | |
| CN | 107440280 A | 12/2017 | |
| CN | 206808904 U | 12/2017 | |
| CN | 104905519 B | 4/2018 | |
| CN | 107951153 A | 4/2018 | |
| CN | 208064709 U | 11/2018 | |
| CN | 208127993 U | 11/2018 | |
| EP | 2866604 A1 | 5/2015 | |
| FR | 2653312 A3 * | 4/1991 | ............. A45C 13/02 |
| GB | 2333033 A * | 7/1999 | ........... G06F 1/1628 |
| MX | 2014015502 A | 3/2015 | |
| NL | 2011786 C2 | 10/2014 | |
| TW | M493299 U | 1/2015 | |
| TW | I590559 B | 7/2017 | |
| WO | 2014004930 A1 | 1/2014 | |
| WO | 2014073971 A1 | 5/2014 | |
| WO | 2014101627 A1 | 7/2014 | |
| WO | 2016144113 A1 | 9/2016 | |
| WO | 2017056093 A1 | 4/2017 | |
| WO | 2017118919 A1 | 7/2017 | |
| WO | 2017156278 A1 | 9/2017 | |
| WO | 2017163120 A1 | 9/2017 | |
| WO | 2017185619 A1 | 11/2017 | |
| WO | 2017185628 A1 | 11/2017 | |
| WO | 2017185634 A1 | 11/2017 | |
| WO | 2018032603 A1 | 2/2018 | |

* cited by examiner

ANGLED CHARGING POCKET

TECHNICAL FIELD

The present disclosure relates generally to luggage articles, and more specifically to angled wireless charging pockets for a luggage article.

BACKGROUND

Many mobile devices (e.g., smartphones, tablets, etc.) now have the function of charging wirelessly through various charging docks, pads, and battery packs. Wireless charging functionality has made its way into use in consumer products, such as luggage articles. In the case of luggage articles, many solutions are costly and require in-depth engineering to create a system that can charge many types of mobile devices. Some solutions cannot adapt to various sizes of mobile devices and wireless power supplies. In addition, some solutions do not hold mobile devices and wireless power supplies in a way that engages the mobile device with the wireless power supply while being carried. For example, some solutions allow frequent disengagement of the mobile device from the wireless power supply, reducing the effectiveness of charging a mobile device while being carried.

It is therefore desirable to provide an improved luggage case, and more specifically an improved pocket that addresses one or all of the above-described problems and/or which more generally offers improvements or an alternative to existing arrangements.

Documents that may be related to the present disclosure include U.S. Pat. No. 9,362,777B2, U.S. Pat. No. 9,461,499B2, U.S. Pat. No. 9,729,003B1, U.S. Ser. No. 10/063,086B2, US20150326044A1, US20160190817A1, US20160322851A1, US20170117742A1, and US20170302099A1.

SUMMARY

The present disclosure provides an angled wireless charging pocket for holding and securing a mobile device in overlying engagement and alignment with a wireless power supply to facilitate convenient charging of the mobile device. The power supply may charge the mobile device wirelessly, by a wired connection, or both. When wirelessly charging the mobile device with the power supply, the proper alignment of the mobile device relative to the power supply aids in efficient charging. When charging the mobile device with a wired connection, the overlying alignment created by the pocket as described herein allows a more convenient shorter wire to be utilized. The pocket is positioned on a panel of a luggage article, such as within the interior of the luggage article. The pocket includes one or more cradles arranged to receive and secure at least portions of a wireless power supply and a mobile device. The one or more cradles of the pocket are aligned at a lower corner such that the wireless power supply and the mobile device are held and engaged in overlying alignment at the lower corner. The pocket may be angled to guide the wireless power supply and mobile device towards the lower corner such that corners of the wireless power supply and mobile device are aligned at the lower corner of the pocket.

According to a first aspect of the present disclosure, there is provided a luggage article having a pocket for receiving at least a portion of a power supply and a mobile device, including a panel; and the pocket attached to a surface of the panel, the pocket including a first cradle arranged to receive and secure at least a portion of a power supply, and a second cradle arranged to receive and secure at least portions of a mobile device, the first and second cradles of the pocket aligned at a lower corner such that the at least portion of the power supply and the mobile device are held and engaged in overlying alignment at the lower corner. Optionally, the lower corner of the pocket may be configured to position the at least portion of the power supply and the mobile device at a register position. Additionally and optionally, the lower corner of the pocket may be configured to position the corner of the at least portion of the power supply and the corner of the mobile device, in an aligned configuration and positioned at a register location.

Optionally, the panel at least partially defines an internal storage compartment of the luggage article; the pocket is defined within the internal storage compartment.

Optionally, the first and/or second cradle of the pocket may include two adjacent edges extending from the lower corner at an angle to both vertical and horizontal when the luggage article is in an upright position. In one example, one adjacent edge is a bottom edge and the other adjacent edge is a lateral edge. Additionally, the first and/or second cradle of the pocket may include three edges, including a bottom edge and a first lateral edge extending from the lower corner at an angle, and a second lateral edge extending from the bottom edge spaced apart from the first lateral edge. Optionally or additionally, the first and or second cradle may include a bottom edge, a top edge, and two lateral edges. Optionally, the angle of the two adjacent walls are configured to guides both the respective power supply and/or the mobile device towards the lower corner to position the power supply and the mobile device into an overlying alignment at the lower corner.

Optionally or additionally, the at least one of the first and/or second cradle at least in part defines a triangular panel with two sides attached along at least portions of the two adjacent edges. Optionally, at least one of the first and/or second cradle is defined at least in part by one or more strap attached to the panel. Additionally or optionally, the at least one of the first and/or second cradle is defined at least in part by a pair of straps connected together. Additionally or optionally, the pair of straps defines a T-shape.

Optionally, the power supply may include an electrical connector, an electrical wire having opposing ends, one of the ends for connecting to the power supply and the other of the ends for connecting to a mobile device or to at least one electrical connector positioned on the exterior of the luggage article.

According to a second aspect of the present disclosure, there is provided a luggage article, having a pocket for receiving at least a portion of a power supply and a mobile device, including a plurality of panels defining an internal storage compartment; a pocket defined within the internal storage compartment and attached to one of the plurality of panels, the pocket arranged to receive and secure at least portions of a power supply and a mobile device therein, the pocket including two adjacent edges arranged at an angle to both vertical and horizontal when the luggage article is in an upright position to define a lower corner; wherein the pocket is arranged such that the power supply and the mobile device are positioned and aligned in at least partial overlying alignment at the lower corner. Optionally or additionally, the power supply and mobile device are biased under gravity force or a force applied by the user towards overlying alignment at the lower corner to align corners of each of the power supply and mobile device at the lower corner. Optionally or additionally, one adjacent edge is a bottom wall and the other adjacent edge is a lateral edge, and the pocket is open on sides opposite the bottom wall and the lateral edge and arranged to receive the power supply and/or the mobile device within the pocket.

Optionally or additionally, the pocket may include one or more cradles to receive and secure at least portions of the power supply and the mobile device. Optionally or additionally, the pocket may include a first cradle and a second cradle overlying the first cradle, the first cradle arranged to receive and secure at least portions of one of the power supply and the mobile device, the second cradle arranged to receive and secure at least portions of the other of the power supply and mobile device.

Optionally or additionally, a fabric panel may be positioned between the first and second cradles to at least partially define each of the first and second cradles. Additionally, the luggage article of claim 16, wherein the fabric panel forms a triangular panel, with two of the three sides respectively attached to the two adjacent edges of the pocket. Optionally or additionally, the fabric panel may include an elasticated portion extending between the attached sides of the triangular panel to at least partially retain at least one of the power supply and mobile device within the pocket.

Optionally, at least portions of the power supply and the mobile device are received within a single cradle.

Optionally, the two adjacent edges are structurally joined at the lower corner by a physical connection or are not structurally joined at the lower corner and a gap is formed.

According to a third aspect of the present disclosure, there is provided a luggage article, having a pocket for receiving at least a portion of a power supply and a mobile device, including a housing defined by a plurality of panels; a pocket defined on a surface of one of the plurality of panels and configured to secure at least portions of a power supply and a mobile device therein, the pocket including a lower corner and two adjacent edges extending at an angle to both vertical and horizontal when the luggage article is in an upright position, and wherein the angle of the two adjacent edges are configured to guide both the power supply and mobile device towards the lower corner to position the power supply and mobile device in overlying alignment at the lower corner. Optionally or additionally, the two adjacent edges extend orthogonally to each other. Optionally or additionally, the two adjacent edges extend at an angle between 25 degrees and 70 degrees to horizontal when the luggage article is in an upright position. Optionally, or additionally, one of the two adjacent edges extends at a 60-degree angle relative to horizontal when the luggage article is in an upright position.

Optionally or additionally, the pocket is defined on an interior surface of the one of the plurality of panels.

Optionally or additionally, the power supply and the mobile device are held and engaged in overlying alignment at the lower corner.

Optionally or additionally, the two adjacent edges are spaced apart at the lower corner such that the lower corner is defined only by extrapolation of the edges.

Additional embodiments and features are set forth in part in the description that follows, and will become apparent to those skilled in the art upon examination of the specification or may be learned by the practice of the disclosed subject matter. A further understanding of the nature and advantages of the present disclosure may be realized by reference to the remaining portions of the specification and the drawings, which forms a part of this disclosure. One of skill in the art will understand that each of the various aspects and features of the disclosure may advantageously be used separately in some instances, or in combination with other aspects and features of the disclosure in other instances.

BRIEF DESCRIPTION OF THE DRAWINGS

The description will be more fully understood with reference to the following figures in which components are not drawn to scale, which are presented as various examples of the present disclosure and should not be construed as a complete recitation of the scope of the disclosure, characterized in that.

DETAILED DESCRIPTION

Figure 1:
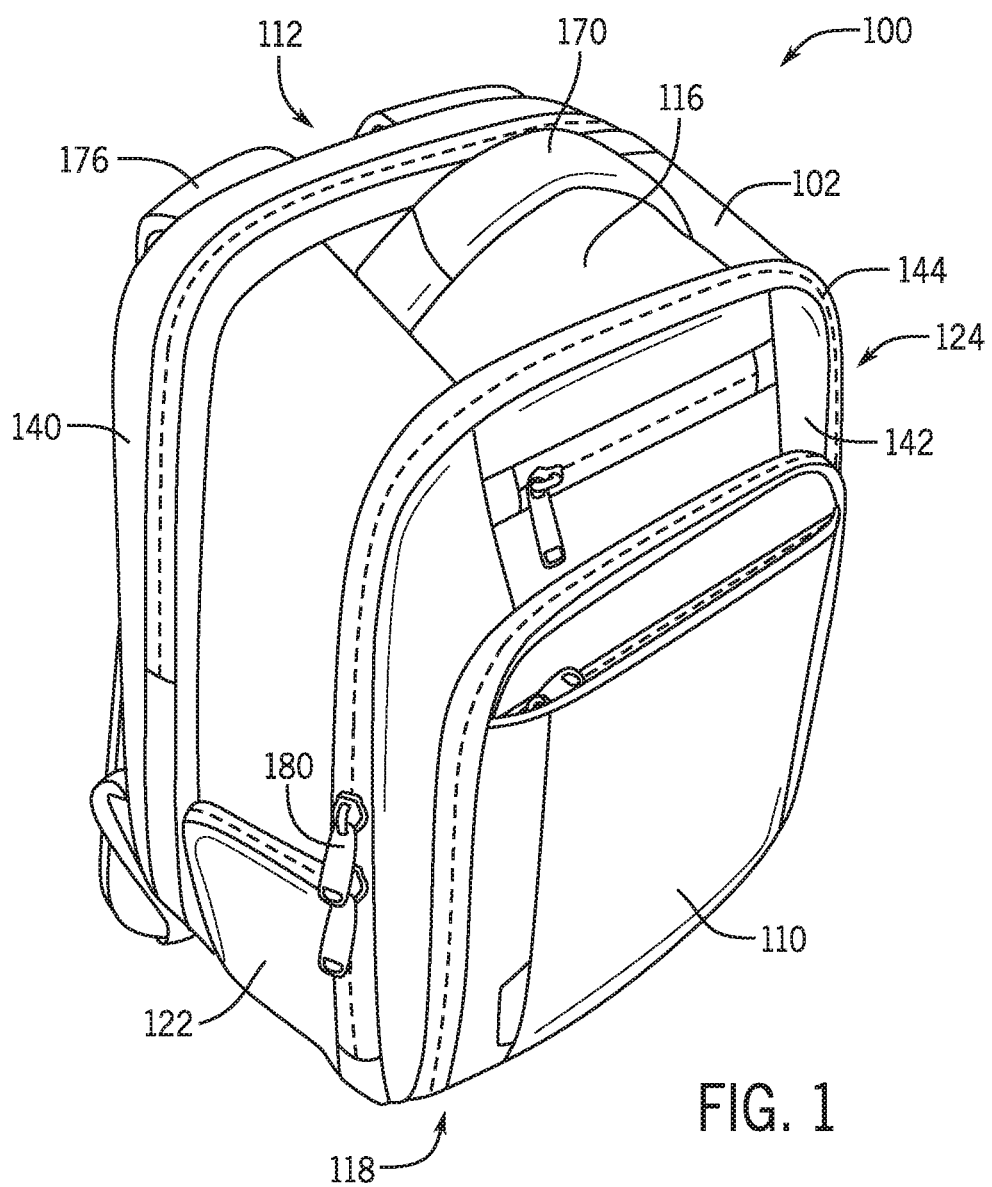
FIG. 1 is an isometric view of a luggage article according to some examples of the present disclosure.

According to the present disclosure, a pocket is provided for receiving and aligning a mobile device by itself, or together with a power supply, within the pocket. The power supply may be a wireless power supply. The pocket may be positioned on a panel of a luggage article, such as within an interior storage compartment of the luggage article. When the luggage article is in an upright position, the pocket may positioned on an angle relative to the horizontal to guide the mobile device and/or power supply to a register position (for example, with their respective corners seated in the lower corner) to maintain alignment of the mobile device with at least a portion of the power supply to facilitate wireless charging of the mobile device. For instance, when both a mobile device and a power supply are received in the pocket, the angle of the pocket may guide the mobile device and the power supply towards a lower corner of the pocket to align corners of the wireless power supply and mobile device and wireless power supply at the lower corner of the pocket. The aligned corners seated in the lower corner of the pocket assist in ensuring the mobile device is held in a position to facilitate effective wireless charging by the power supply.

In this description, a power supply includes a charging device, such as a battery, having a wireless charging feature or features for wirelessly charging a mobile device, and optionally may include at least one outlet (connector) to allow for wired charging of a mobile device and/or charging of the charging device itself. The power supply may be portable. The mobile device may include a wireless charging feature in order to be wirelessly charged by the power supply. The wireless charging feature on the power supply may include, as one example, an inductive charging coil. The wireless charging feature on the mobile device may be an inductive receiving coil. When positioned relatively close to one another in a defined manner, the inductive charging coil creates an alternating electromagnetic field, which the receiver coil on the mobile device converts to electricity to be fed into the battery of the mobile device. Typically, for wirelessly charging to function effectively, the mobile device and the power supply need to be positioned relatively close together, and in general the wireless charging is more efficient and effective when the charging coil of the power supply is closely adjacent to or in contact with the mobile device. Often, for effective wireless charging the power supply and the mobile device may engage one another directly or may be slightly spaced apart, such as by a thin layer of material. To achieve functional wireless charging performance, the power supply and mobile device may be close to one another, such as adjacent to one another or in engagement (or slightly spaced apart). Additionally, it may be beneficial for the power supply and mobile device to be substantially overlying each other. When held in an overlying position, the charging coil and receiving coil may be sufficiently positioned to allow wireless charging. For effective charging, the receiving coil may be aligned with the power supply, and more particularly with the charging coil of the power supply. In some examples, the receiving coil and the power supply or the charging coil of the power supply may be aligned relative to one another by aligning a corner of the mobile device with a corner of the power supply.

Regarding the power supply, the battery and wireless charging feature, such as the charging coil, may be integrally formed together, for example both being positioned in one housing, or may be separate from one another but electrically connected, which may forms an example of at least a portion of the power supply. The electrical connection between the charging coil and the battery may be by a permanent wire, or a wire separable from either or both of the charging coil and/or the battery. Where the charging device includes a battery and a charging coil separate from one another, both components may be received in the pocket, or either one of the components may be received in the pocket. Where the charging coil is received in the pocket and the battery is positioned elsewhere in the luggage case, the charging coil may be a separate component received in and removable from the pocket, or may be secured within the pocket permanently or removably (such as by a hook and loop fastener). Alternatively, a charging coil may be positioned within or secured on the surface of the panel of the luggage case to which the pocket is attached, and located in a position to be in relative alignment with the mobile device when the mobile device is received in the pocket and seated in the pocket. Alternatively, the power supply may include a battery with at least one outlet (e.g. an electrical connector) for use with wired charging and no charging coil. Similar to that noted above, where the charging coil and the receiving coil may be aligned together to facilitate effective wireless charging, where the charging coil is separate from the power supply, the pocket may position receiving coil of the mobile device to align it with the charging coil.

Figure 2:
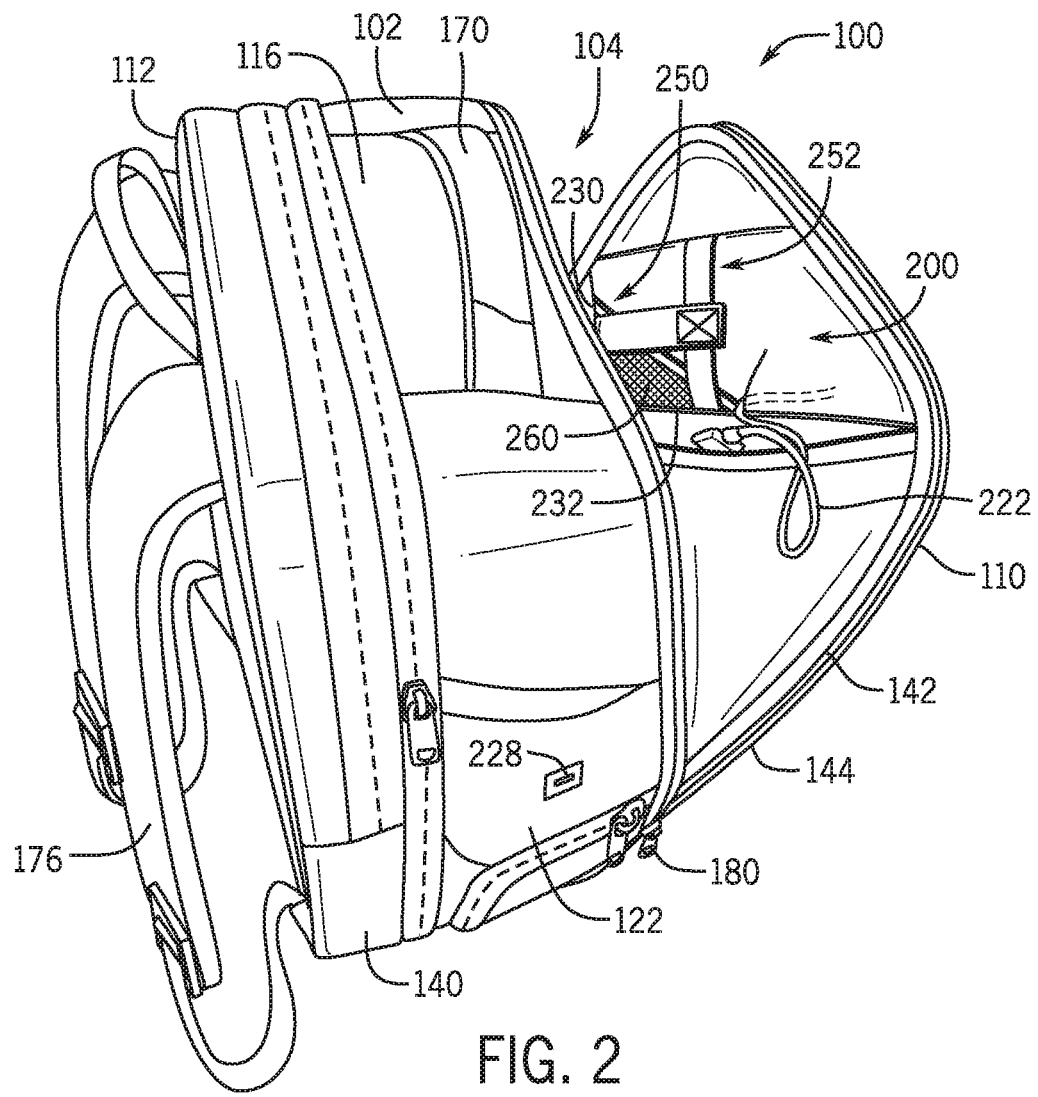
FIG. 2 is an isometric view of the luggage article of FIG. 1 in an open configuration and showing an angled pocket according to some examples of the present disclosure.

FIGS. 1 and 2 illustrate an exemplary luggage article 100 according to some examples of the present disclosure. The luggage article 100 includes a housing 102 formed from a plurality of walls or panels (hereinafter "panels" for the sake of convenience without intent to limit) defining an internal storage compartment 104 in which to carry a user's belongings. In one example, the housing 102, which may be referred to as a main body of the luggage article 100, may be formed from opposing front and rear panels 110, 112 and a plurality of side panels extending between the front and rear panels 110, 112. For instance, the luggage article 100 may include opposing top and bottom panels 116, 118 and opposing left and right side panels 122, 124 extending between the front and rear panels 110, 112. Corner regions may be defined by the intersection of any two or three adjacent panels. For example, corners formed by the intersection of any three adjacent panels may be considered a "corner region." Edges formed by the intersection of any two adjacent panels may also be considered a "corner region" or "edge region."

The various panels may be formed from soft side material, hard side material, or many combinations thereof (such as for instance a hybrid luggage case). The various panels may be configured or arranged to provide a desired size and shape of the housing 102, such as providing a height, width, and depth of the housing 102. The panels may be sized and shaped such that the luggage article 100 is taller than it is wide, wider than it is deep, wider than it is tall, deeper than it is tall, or the like. Other sizes and shapes of the housing 102 are contemplated, and the examples shown and described are for illustration purposes only.

Figure 11:
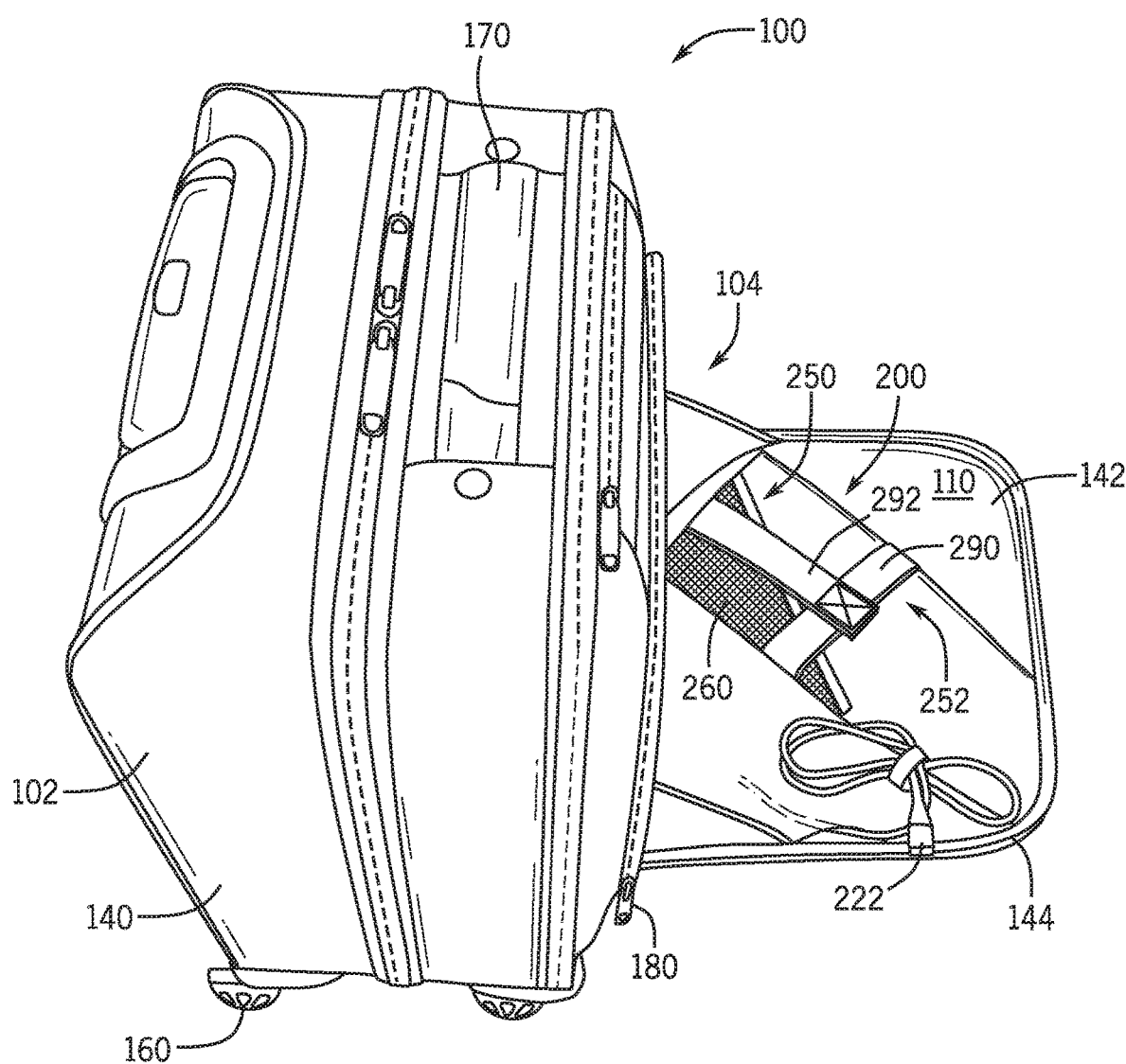
FIG. 11 illustrates the angled pocket associated with an additional luggage article according to some examples of the present disclosure.
Figure 12:
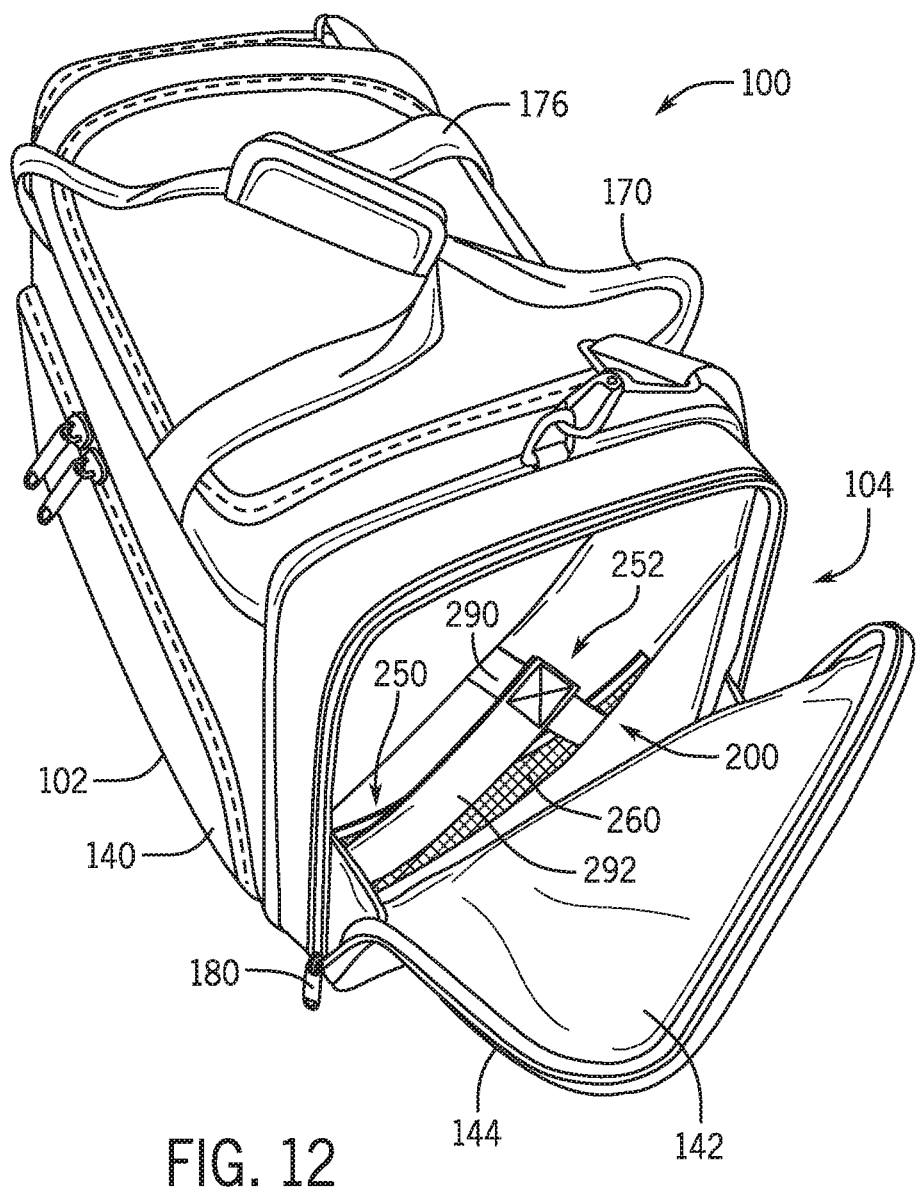
FIG. 12 illustrates the angled pocket associated with an additional luggage article according to some examples of the present disclosure.
Figure 13:
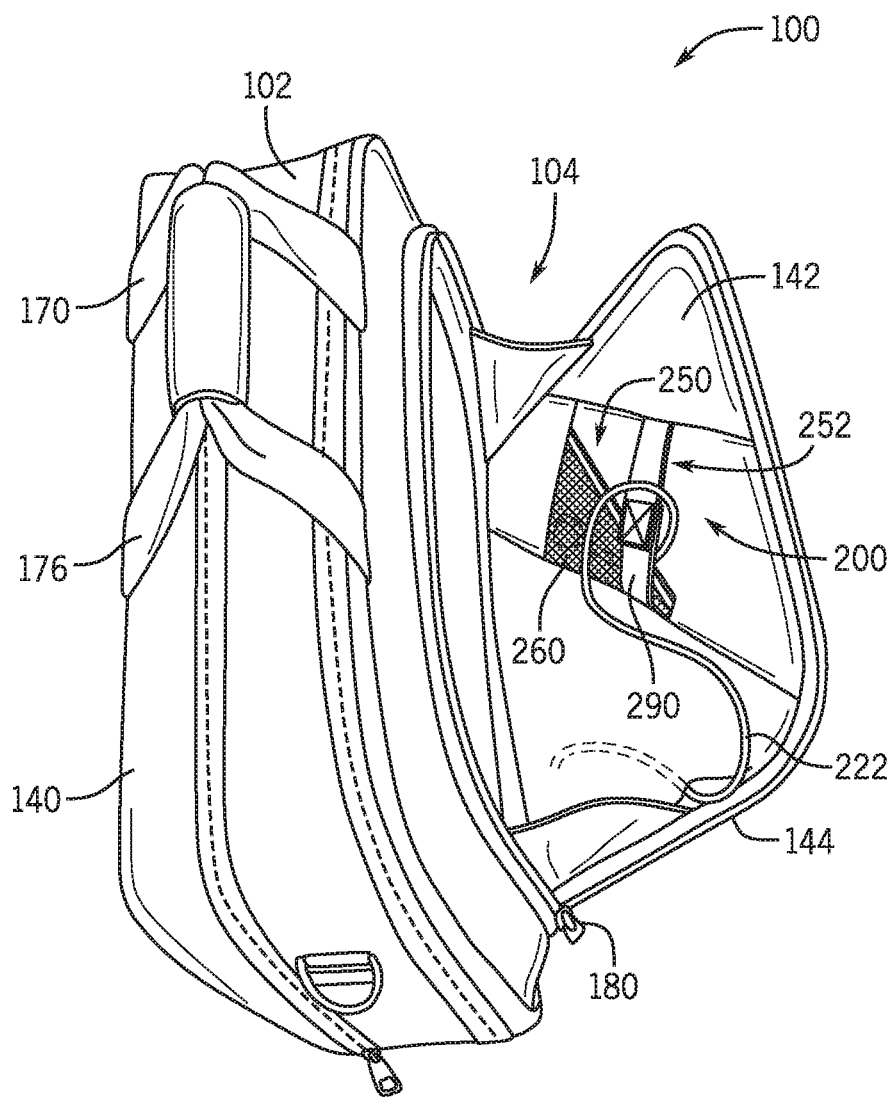
FIG. 13 illustrates the angled pocket associated with an additional luggage article according to some examples of the present disclosure.

The luggage article 100 illustrated in FIG. 1 is a backpack but may be many types of luggage, including an upright spinner case (soft side, hard side, or hybrid construction) (see FIG. 11), a briefcase (see FIG. 13), a duffle bag (see FIG. 12), a purse, or the like. As shown, the luggage article 100 includes a base 140 and a lid 142 defined by a line of separation 144. The luggage article 100 may be transformable between different configurations, such as between a closed configuration and an open configuration. In the closed configuration, the base 140 and lid 142 may be positioned adjacent to each other, and in one example with respective rims or peripheries of the base 140 and lid 142 in engagement, to enclose a user's belongings within the internal storage compartment 104 of the luggage article 100. In the open configuration, the base 140 and lid 142 may be re-oriented relative to each other, such as in one example pivoted away from each other, to allow user access to the interior of the luggage article 100.

To allow selective movement of the base 140 and lid 142 between the open and closed configurations, the lid 142 may be hingedly coupled to the base 140 by a hinge structure or similar mechanism to allow selective positioning of the lid 142 relative to the base 140. In such examples, the lid 142 may be pivoted towards or away from the base 140 to close or open the luggage article 100, respectively. The hinge structure may be a fabric strip, a piano hinge, a living hinge, spaced-apart discrete hinges, a zipper structure, an articulating joint made of elastomeric material, or other suitable structure arranged to allow selective positioning of the lid 142 relative to the base 140 from fully closed to fully open.

The lid 142, which may be referred to as a first luggage portion or section, may be defined by one or more panels. For example, the lid 142 may be defined by the front panel 110, either entirely or in part. In some examples, the lid 142 may be defined by the front panel 110 and at least portions of the top, bottom, left side, and/or right side panels 116, 118, 122, 124 such that the lid 142 includes edge portions. In like manner, the base 140, which may be referred to as a second luggage portion or section, may be defined by one or more panels. For instance, the base 140 may be defined by the rear panel 112, either entirely or in part. Similar to the lid 142, the base 140 may be defined by the rear panel 112 and at least portions of the top, bottom, left side, and right side panels 116, 118, 122, 124 such that the base 140 includes edge portions. In such examples, the edge portions of the base 140 may define the top, bottom, left side, and right side panels 116, 118, 122, 124 in combination with the edge portions of the lid 142. In some examples, the base 140 may be defined by a portion of the front panel 110.

The luggage article 100 is illustrated as a backpack, but may be any type of luggage article. In like manner, the housing 102 may be formed from many combinations of hard side and soft side material. For example, at least portions of the housing 102 may be molded from hard side material, or formed from a combination of hard side material and soft side material (known as "hybrid" construction). In some examples, the housing 102 may be formed entirely from soft side material supported by a frame structure. The hard side material may be a thermoplastic material (self-reinforced or fiber-reinforced), ABS, polycarbonate, polypropylene, polystyrene, PVC, polyamide, PTFE, or biaxially oriented polypropylene, among others. The soft side material may be nylon, canvas, polyester, leather, PVC, polypropylene, polyethylene, and/or PTFE, among others.

The luggage article 100 may include other features for convenience. For example, the luggage article 100 may include one or more support member 160 to support the luggage article 100 against a support surface (e.g., against the ground). The support member 160, which may be a foot, a fixed wheel assembly, a spinner wheel assembly, or any combination thereof, may be associated with any suitable panel of the housing 102, such as in at least one example connected to at least the bottom panel 118. Where the luggage article 100 is an upright spinner case, the luggage article 100 may include four support member 160. The support member 160 may be connected to any suitable portion of the housing 102, such as at or near the corner regions along the bottom panel 118.

The luggage article 100 may include one or more carry handles 170 connected to at least one of the panels of the housing 102. In some examples, the luggage article 100 may include one or more carrying straps 176, such as a pair of backpack straps. In some examples, the luggage article 100 may include a closure mechanism 180 to selectively secure the lid 142 and the base 140 together. The closure mechanism 180 may be positioned along or adjacent to the line of separation 144 between the lid 142 and the base 140 (such as along or adjacent to a periphery of the lid 142) to allow selective actuation for opening and closing of the luggage article 100. In an open configuration, the closure mechanism 180 is disengaged along substantially the entire length of the line of separation 144, thereby allowing the lid 142 and the base 140 to pivot relative to each other to any amount from partially open to fully open. In a closed configuration, the closure mechanism 180 is engaged along at least a portion of the length of the line of separation 144 to limit relative movement between the lid 142 and the base 140. The closure mechanism 180 may be any suitable closure device or system. For instance, the closure mechanism 180 may be a zip closure or attachment, though other types of closure devices are contemplated, including one or more latches spaced along the line of separation 144.

Referring to FIGS. 2, 3, 4, and 5A, the luggage article 100 includes a pocket 200 to receive and secure at least portions of a power supply 210 and a mobile device 220 therein. Depending on the particular application, the mobile device 220 may be a phone, a tablet, a game console, an MP3 player, or other portable electronic device. In some examples, the power supply 210 may be operable to wirelessly charge the mobile device 220. In that regard, the power supply 210, which may be referred to as a wireless power supply, may include many configurations operable to inductively charge the mobile device 220 when positioned in close proximity to each other. For instance, the power supply 210 may include one or more induction coils to create an electromagnetic field. The mobile device 220 may include one or more induction coils that receives power from the electromagnetic field to charge the mobile device 220. More particularly, the electromagnetic field generated by the induction coils of the power supply 210 may induce a current in the induction coils of the mobile device 220 to charge the mobile device 220. Wireless charging of the mobile device 220 by the power supply 210 may adhere to many standards, including the Qi and/or PMA standards, among others.

Though wireless charging of the mobile device 220 by the power supply 210 is discussed, other configurations are contemplated, including examples where the mobile device 220 is charged by the power supply 210 through a cord connected between the power supply 210 and the mobile device 220, among others. For example, as shown in at least FIGS. 2, 3, and 13, the luggage article 100 may include an electrical wire or wired charging cable 222, such as a USB cord. In one example, the wired charging cable 222 may plug into an electrical outlet on both the power supply 210 and mobile device 220 to charge the mobile device 220 by a wired connection. Additionally or alternatively, the wired charging cable 222 may connect into the power supply 210 to be used to charge another device by wired connection. The other device may be located within the pocket 200 or within another pocket of the luggage article 100. The wired charging cable 222 may lead to one or more electrical connections 228 (see FIG. 2), such as one or more outlet port(s) positioned inside or on the exterior surface of the luggage article 100.

The pocket 200 may include many configurations, and is generally described herein with the luggage article 100 in an upright position, meaning the bottom of the luggage case is positioned on a support surface, such as a floor. For instance, the pocket 200 may be positioned on one of the plurality of panels 10 defining the housing 102 of the luggage article 100. In some examples, the pocket 200 may be attached to a surface of an internal panel 224 of the luggage article 100. As shown in FIG. 2, the pocket 200 may be defined within the internal storage compartment 104 of the housing 102, such as within a main storage compartment, within an auxiliary storage compartment separate from the main storage compartment (e.g., a front or side pocket of the luggage article 100), or the like. In this manner, the pocket 200 may be attached to a panel of the housing 102 that at least partially defines the internal storage compartment 104 of the luggage article 100. As shown in FIG. 2, the pocket 200 may be attached to the interior surface of the front panel 110 of the housing 102, though other configurations are contemplated. For instance, the pocket 200 may be attached to the interior surface of the lid 142, which is formed by a panel 110 of the housing. Alternatively, the pocket 200 may be attached inside the housing 102 to a different wall, or may be attached to the exterior of the housing 102.

Referring further to FIGS. 2, 3, 4, and 5A, an example of the pocket 200 is shown being formed with two cradles 250, 252, but alternatively may include only one cradle among other configurations as is described below. The pocket structure is first generically described, and later is described in terms of each of the example either or both of the cradle structures 250, 252 further below.

The pocket 200, as described herein, may include a cover panel 234 and two edges 230, 232. The two edges 230, 232 define the peripheral boundaries of this example of the pocket. The cover panel 234 extends at least between portions of the first and second edges 230, 232. The two edges 230, 232 may each define an edge boundary of the pocket, and may also intersect one another to define a lower corner 226. For instance, the pocket 200 may include first and second edges 230, 232 intersecting at the lower corner 226. The pocket 200 may be fixed to the panel 110 along at least portions of the first and second edges 230, 232. In this manner, the dimension of the pocket 200 may be defined by only the first and second edges 230, 232. The two edges 230, 232 each extend from the lower corner 226 at an angle to both vertical and horizontal when the luggage article is in an upright position. The corner 226 is may be the only corner defined by the pocket, and may be the portion of the pocket 200 closest to the bottom of the luggage article 100 when in the upright position, making it the lower corner 226 of the pocket 200. In such examples, the pocket 200 may be open on the sides opposite to the first and second edges 230, 232.

Figure 3:
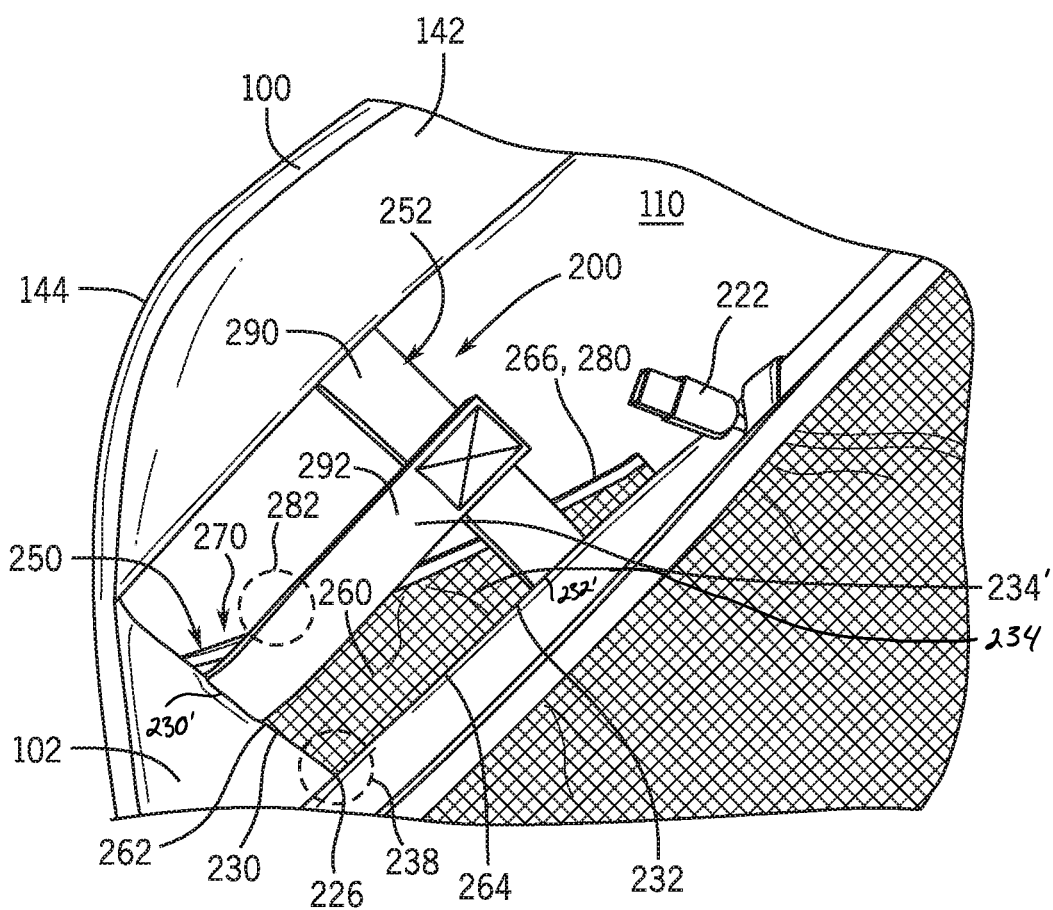
FIG. 3 is an enlarged view of the angled pocket of FIG. 2.
Figure 4:
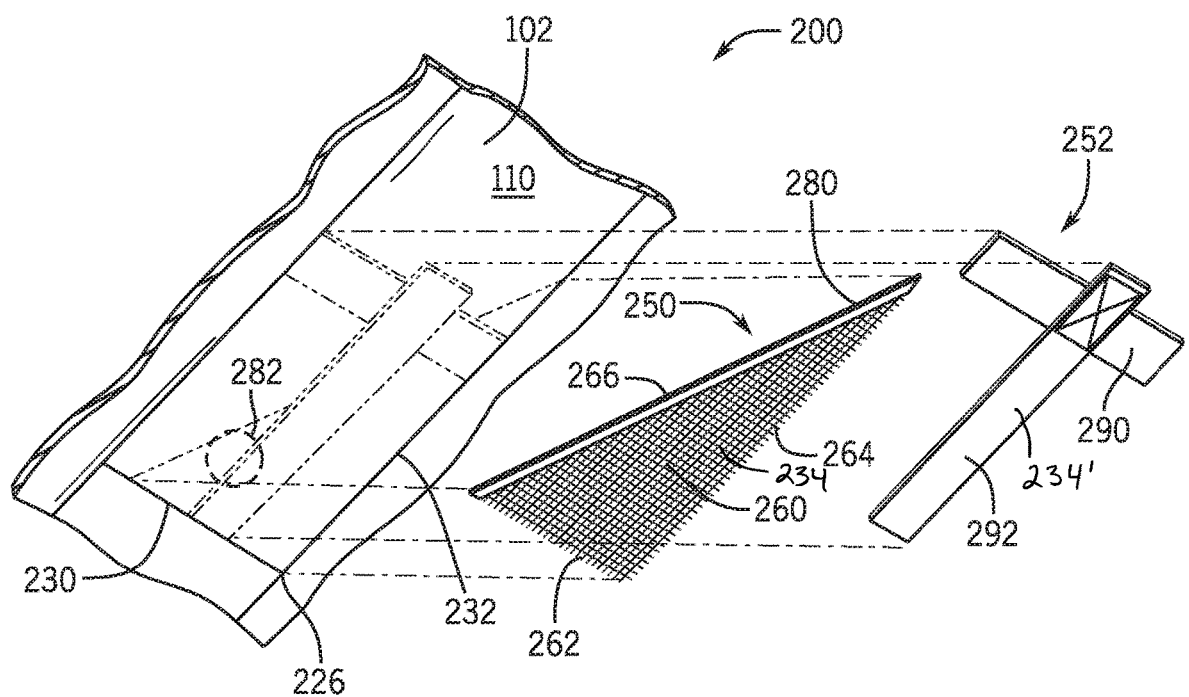
FIG. 4 is an exploded view of the angled pocket of FIG. 3.

As shown in FIGS. 3 and 4, the first edge 230 may extend along at least a portion of the width of the pocket 200; and the second edge 232 may extend along at least a portion of the length of the pocket 200. Both edge 230 and edge 232 are adjacent to the corner and extend away from each other. Edge 230 and edge 232 are adjacent one another. In some examples, the pocket 200 may be longer than or shorter than the power supply 210 and/or mobile device 220. In the examples of the edges described here, an edge of the pocket 200 may be defined by a line of stitching or other securement (e.g. glue or other adhesive), such as for securing the cover 234 to the panel to which the pocket is attached; a seam formed between the cover 234 and the panel; or a separate strip or portion of material spacing the cover panel 234 away from the panel to which the pocket 200 is attached.

When positioned in the pocket 200, the device (whether the mobile device 220 and/or the power supply 220) may engage the edge 230 or the edge 232. Whichever edge 230, 232 is contacted acts as a positioning feature (such as in one example a guide rail) to direct the device further into the pocket until the corner 242, 244 of the device is positioned or seated in the lower corner 226 of the pocket, which is the register position. In one example, with the corner 242, 244 of the device positioned in the lower corner 226, the device may contact or nearly contact the other of the edges 230, 232. A portion of the device may be covered by the cover panel 234.

When both the mobile device 220 and the power supply 210 are received in the pocket 200 at the same time, the first and second edges 230, 232 of the pocket 200, as noted above, may engage the power supply 210 and/or mobile device 220 to guide the power supply 210 and/or mobile device 220 towards the lower corner 226 and hold them in overlying alignment. For example, and referring to FIG. 7, the first and second edges 230, 232 may engage portions (e.g., edge 248) of the power supply 210 and/or mobile device 220 (edge 256) such that lower corner 242 of the power supply 210 and lower corner 244 of the mobile device 220 are aligned together and in an overlying arrangement in the register location 238 for accommodating wireless charging.

In one example, "aligned" together may mean that the corner 242, 244 of each of the mobile device 212 and the power supply 244 are overlying each other in a common, register position 238 defined by the at least two edges 230, 232 of the pocket 200. The lower corner 226 (whether closed or open) defines the register position 238 that the respective corners of each device are urged towards by the two adjacent edges 230, 232 of the pocket. This aligning of the power supply 210 and mobile device 220 may occur regardless of whether the lower corner 226 is defined by a closed corner or a gap/opening. In the register position 238, the inductive charging component of the power supply 210 is positioned properly with the inductive charging component of the mobile device 220 to allow the power supply to reliably wirelessly charge the mobile device. When the inductive charging components of the mobile device and power supply are not properly aligned, such as when they are simply placed in a pocket together without proper relative positioning, the wireless charging may be unreliable, inefficient and/or ineffective. The alignment of the mobile device and power supply corners 244, 242, respectively, does not require exact co-extensive alignment of the peripheral edges of each of the mobile device and power supply. As long as the corners 242, 244 are positioned by the edges 230, 232 of the pocket 200 to be in the register position 238, the alignment may be imprecise and still be effective to allow for wireless charging. Alternatively, the pocket 200 may align the receiving coil of the mobile device 220 with the charging coil of the power supply 210.

Alternatively, in one example, the charging coil 282 of the power supply 210 is physically separate from the power supply 210 but electrically connected. The battery of the power supply may be positioned in another location within the luggage article. Referring to FIGS. 3 and 4, the remote charging coil 282 is positioned in or on the panel 110 that forms a back wall of the pocket. The charging coil 282 is shown in dash. When the mobile device 220 is positioned in the pocket 200, and the mobile device is adjacent the edge 230 and edge 232, with a corner of the mobile device 220 positioned at the corner 226 of the pocket 220 in the register position 238, the receiving coil of the mobile device 220 may be aligned with the charging coil 282 to allow for effective wireless charging. For example, referring to FIG. 5A, if the power supply in FIG. 5A was replaced with the mobile device 210 in pocket 200, the receiving coil in the mobile device would be aligned with the charging coil 282 positioned in or on the panel 110, and retained there by cover panel 234.

Figure 10:
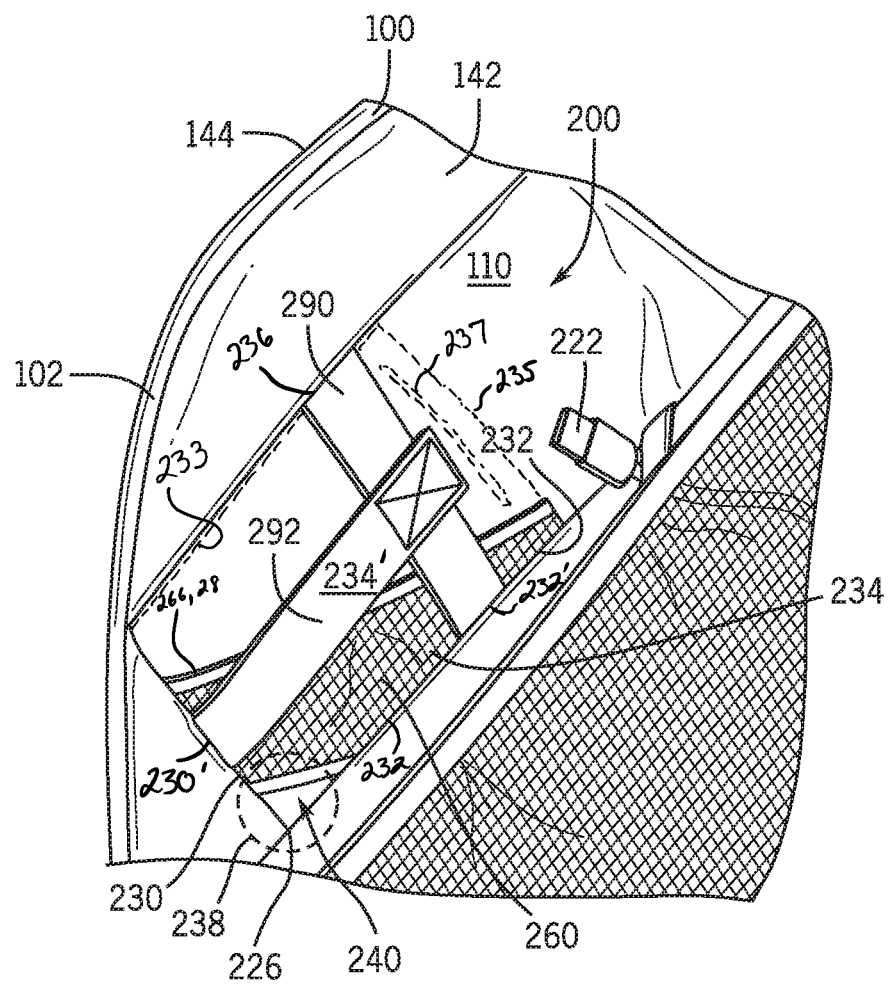
FIG. 10 is an enlarged view of an additional angled pocket according to some examples of the present disclosure.

As described herein, joining of the first and second edges 230, 232 at the lower corner 226 can mean the edges 230, 232 intersect each other physically or by extrapolation of the direction of extension of the edges 230, 232. More particularly, depending on the particular application, the first and second edges 230, 232 may extend from the lower corner 226 such that the first and second edges 230, 232 are joined at the lower corner 226 by a physical connection, such as, in one example, the lower corner 226 defined by the intersection of stitched edges 230, 232. In alternative examples, the first and second edges 230, 232 may be spaced apart at the lower corner 226 such that the lower corner 226 is defined by extrapolation of the line of extension of each of edges 230, 232. In this manner, the lower corner 226 may be an opening (or gap) 240 between adjacent ends of the first and second edges 230, 232, as shown in FIG. 10. In either example, the edges 230, 232 form the lower corner 226, define or establish the register position 238, and may maintain alignment of the power supply 210 and the mobile device 220, as explained more fully below.

The pocket 200 may be configured to hold both a power supply 210 and/or a mobile device 220 of varying sizes in the proper relative orientation and proximity for effective charging of the mobile device 220. Referring to FIG. 5B, the pocket 200 is schematically shown for purposes of clarity, and its periphery is defined by two adjacent edges or side edges 230 and 232 that form a V shape and intersect (physically or by extension) at lower corner 226. The edges 230, 232 define the periphery of the pocket structure. Edges 230 and 232 may define the bottom periphery edges of the pocket, with the lower corner 226 indicating where the edges 230 and 232 physically or by extension intersect. Corner 226 is shown in dash to indicate that it may be a physical corner or a virtual corner. The pocket does not define a edge opposite to edge 230, nor does it define a edge opposite to edge 232, and is open along that portion of the pocket 200. Because the pocket 200 is defined only by two lower edges 230 and 232 which extend away from the corner 226, the pocket 200 can receive articles of varying size. In the example of FIG. 5B, the power supply 210 and mobile device 220 are shown positioned in the pocket. The power supply 210 is longer and wider than the mobile device 220. In another example, a differently sized power supply 210a (for example larger than power supply 210) and a differently sized mobile device 220a (for example smaller than power supply 220) are shown as examples of the variety of sizes able to be received in the pocket 200 being formed having two edges 230, 232 (and/or 230', 232'). Despite the difference in size between these various component sizes, a long (lateral) side of each is positioned near to or engaged with the edge 232 of the pocket 200, and the short (bottom) side of each is positioned near to or engaged with the edge 230 of the pocket, with the corner 242 of the power supply 210 and the corner 244 of the mobile device 220 seated at or near the lower corner 226 and in alignment with one another. The corners 242 and 244 are also located at the register position 238. Within practical limits, regardless of the length and width of the power unit 210 and mobile device 220, when positioned in the pocket 200, a corner of each device will be seated at the lower corner 226 and located in the register position 238.

The pocket 200 may be arranged to hold and engage the power supply 210 and the mobile device 220 in overlying alignment for effective charging of the mobile device 220 by the power supply 210. For instance, the structure of the pocket 200, such as the edges 230 and/or 232, may guide the power supply 210 and the mobile device 220 into proper relative orientation and in close proximity to allow effective wireless charging of the mobile device 220 by the power supply 210. In some examples, the pocket 200 may be arranged such that the power supply 210 and the mobile device 220 are guided by the edges 230 and 232 into overlying alignment at the lower corner 226. For instance, the first and second edges 230, 232 may extend at an angle to both horizontal and vertical when the luggage article 100 is in an upright normal position. The edges of the mobile device and/or the power supply engage the edges 230 and 232 which act as positioning features (such as in one example guide rails) to guide the mobile device and/or power supply into a position with their respective corners positioned in the lower corner 226 and in the register position 238. The mobile device and/or the power supply may move along the length of the edge or edges under the force of gravity, or under the force of the user inserting the device or devices into the pocket 200.

For instance, the pocket 200 may include one or more cradles defining a lower corner 226 to receive and secure at least portions of the power supply 210 and/or the mobile device 220 and align one or both of the respective lower corners 242, 244 in the register position 238. For instance, the pocket 200 may include a first cradle 250 arranged to receive and secure at least portions of the power supply 210, the mobile device 220, or both the power supply 210 and the mobile device 220 together. The pocket 200 may also include a second cradle 252 arranged to receive and secure at least portions of the mobile device 220, the power supply 210, or both the power supply 210 and the mobile device 220 together. Such configurations are illustrative only, and the pocket 200 may include a single cradle that receives and secures at least portions of both the power supply 210 and the mobile device 220 together. The pocket 200 may include more than one cradle, with both the power supply 210 and the mobile device 220 positioned together in one of the more than one cradles (e.g. both cradles do not need to be utilized). The structures described herein for either the first cradle 250 and the second cradle 252 may be utilized where the pocket 200 only includes one cradle. Where the pocket 200 includes two or more cradles, the structure described herein for the first cradle 250 example may be utilized to form both the first and the second cradles. Alternatively, where the pocket 200 includes two or more cradles, the structure described herein for the second cradle 252 example may be utilized to form both the first and the second cradles.

The first cradle 250 may include many configurations. In one example, the first cradle 250 at least in part defines a panel 260 with two sides attached to the two adjacent edges. In particular, the panel 260 may include a first side 262 attached to the first edge 230, and a second side 264 attached to the second edge 232. The panel 260 may also include a third side 266 extending between terminal ends of the first and second sides 262, 264. The third side 266 of the panel 260 may not be attached to the edge 230 and define an opening 270 through which portions of the power supply 210 and/or mobile device 220 are received to secure the power supply 210 and/or mobile device 220 within the first cradle 250. The third side 266 may be straight, forming the first panel 260 into a general triangular shape. The third side may be curved or of another shape to form a different shape out of the first panel 260. The panel 260 may be all or a portion of the cover panel 234.

In this example of first cradle 250, shown in FIGS. 3 and 4, the first edge 230 may be referred to as a bottom edge, and the second edge 232 may be referred to as a lateral edge. These designations are consistent with the corresponding edge (bottom and lateral) of the mobile device 220 and/or power supply 210 that is adjacent to or engaging the respective bottom wall 230 and lateral edge 232 when the positioned in the pocket 200. The pocket 200 formed by edges 230, 232 extending away from lower corner 226 form a generally V-shaped with the vertex generally lower than the edges 230, 232. With panel 260 at least partially attached along the edges 230, 232, and edge 266 extending between edges 230, 232, forms a generally triangularly-shaped pocket 200.

In another example, the pocket 200 may include three edges (see for example FIG. 10), where the panel 260 is connected to the panel 110, including first edge 230, second edge 232, and a third edge 233 formed opposite the second edge 232. The third edge 235 may alternatively be formed opposite the first edge 230. In either of these configuration, the edges together form a U-shaped periphery of the pocket, and leaves one portion of the pocket 200 unformed and open to allow a mobile device and power supply to be positioned within the pocket.

In another example, the pocket 200 may include four edges, for instance by including both examples of the third edges (233, 235) referred to above, to form an enclosed periphery of the pocket 200, with an opening 237 in the cover panel 234. This would allow placement of at least one of the power supply and/or the mobile device within the pocket 200, providing a fully enclosed pocket for more secure retention of the power supply and/or the mobile device. In the examples of the edges described here, an edge may be considered as a sidewall of the pocket.

Cradle 250 defines lower corner 226 as noted herein, which may be closed or open. The two adjacent edges 230, 232 are positioned to define the lower corner 226 where the respective corners of the mobile device and power supply are aligned. The edges 230, 232 may be joined together at or near the lower corner to form closed lower corner 226, or may not join together at the lower corner 226. The two adjacent edge 230, 232 extend at an angle to both vertical and horizontal when the luggage article is in an upright position, making in this example the lower corner 226 the corner of the pocket closest to the bottom of the luggage article when it is in an upright position.

As shown in FIG. 3, the triangular panel 260 may be configured to hold a power supply 210 and/or mobile device 220 of varying sizes. As one example, the triangular panel 260 may be formed of a flexible and/or resiliently deformable material, such as mesh, elasticized material, or the like, that allows deformation and/or expansion of the first cradle 250. In some examples, the third side 266 of the triangular panel 260 may be formed by elastic webbing 280 to allow resilient deformation of the third side 266 of the triangular panel 260 away from the housing panel to which the pocket 200 is attached. In such examples, the third side 266 may resiliently deform to allow the opening 270 of the first cradle 250 to expand to account for devices of varying thicknesses, widths, etc. For instance, the third side 266 may be defined, at least in part, by a resilient portion (such as in one example an elasticated strap) to hold the power supply 210 and/or mobile device 220 within the pocket 200. Where the panel 260 is formed of a resilient material, it may also provide a securing or retaining force on the object positioned within the pocket.

Like the first cradle 250, the second cradle 252 may include many configurations. For example, the second cradle 252 may be defined at least in part by one or more straps. As shown, the second cradle 252 may be defined at least in part by a pair of straps connected together. More particularly, the second cradle 252 may be defined by a first strap 290 and a second strap 292 connected to the first strap 290. The first strap 290 may include opposing ends attached to the housing 102. The second strap 292 may include opposing ends attached to the housing 102 and the first strap 290. In this manner, the first and second straps 290, 292 may define a T-shape, though other configurations are contemplated, such as a cross. In some examples, the second cradle 252 may be defined by a single strap, such as by the first strap 290 (see FIG. 13). In such examples, the one or more straps may resiliently hold devices of varying sizes. For instance, the one or more straps may resiliently lengthen to receive a mobile device 220 of varying sizes, such as to receive variously sized mobile phones, tablets, or may include a buckle allowing the length to be adjusted. In such examples, the straps may engage and hold side edges of the mobile device 220 to secure the mobile device 220 within the second cradle 252. Cradle 252, namely the straps 290 and 292 together define lower corner 226 as noted herein, and also define the location of register position 238. The two adjacent edges 230, 232 extend from the lower corner 226 at an angle to both vertical and horizontal when the luggage article is in an upright position. The straps may be resilient, such as in one example being made of elastic material.

In this example of second cradle 252, shown in FIGS. 3 and 4, the straps 290, 290 together form at least the first and second edges 230', 232' that define at least a portion of a periphery of the pocket 200. The first edge 230' may be referred to as a bottom edge, and is formed by the attachment of the strap 292 to the panel 110 on which the pocket is positioned. The second edge 232' may be referred to as a lateral edge and is formed by the attachment of the strap 290 to the pane on which the pocket is positioned. The edges 230', 232' formed by the attachment of the straps to the panel define the location of the lower corner 226 for proper alignment of the mobile device or power supply or both, and also define the location of register position 238. The cover panel 234' in this example of the second cradle 252 is defined by the length of each strap 290, 292 extending between the ends of each respective strap attached to the panel on which the pocket is positioned. In this example, the cradle 252 may include a third edge 236 of the pocket 200, the third edge 236 formed opposite the second edge 232' where the strap 290 is secured to the panel 110 on which the pocket is positioned.

In some examples, the second cradle 252 of the pocket 200 may be arranged such that the power supply 210 and/or the mobile device 220 may be guided by the edges 230' and 232' into overlying alignment at the lower corner 226, as described above with respect to the edges 230, 232 of first cradle 250. For instance, the first and second edges 230', 232' may extend at an angle to both horizontal and vertical when the luggage article 100 is in an upright normal position. The edges of the mobile device and/or the power supply engage the edges 230' and 232' which act as positioning features (such as in one example guide rails) to guide the mobile device and/or power supply into a position with their respective corners 242, 244 positioned in the lower corner 226 and in the register location 238. The mobile device and/or the power supply may move along the length of the edge or edges 230', 232' under the force of gravity, or under the force of the user inserting the device or devices into the pocket 200.

The straps, being extendable (by resilience or by a lengthening buckle) would allow placement of at least one of the power supply and/or the mobile device within the pocket 200, providing a pocket with containment on four sides of the contents for more secure retention of the power supply and/or the mobile device. The attachment of the straps 290, 292 to the panel on which the pocket is positioned may be by a permanent means such sewing or adhesive, or by a selectively removable means, such as by hook and loop fasteners. The two adjacent edges 230, 232 are positioned to define the lower corner 226 where the respective corners of the mobile device and power supply are aligned. The edges 230, 232 may not join together, in this example, at the lower corner 226. The two adjacent edge 230, 232 extend at an angle to both vertical and horizontal when the luggage article is in an upright position, making in this example the lower corner 226 the corner of the pocket closest to the bottom of the luggage case when it is in an upright position. Either of the configurations of the second cradle 252 leaves one portion of the pocket 200 unformed to allow a mobile device, power supply, or both to be positioned within the pocket 200.

The one or more cradles 250, 252, may be arranged so that the power supply 210 and/or the mobile device 220 are held and engaged in a desired alignment. For example, the first and second cradles 250, 252 of the pocket 200 may be constructed so as to form a lower corner 226 at the similar or the same location as each other, and such corner 226 defining the register location 238. First cradle 250 and second cradle 252 may, respectively, position the power supply 210 and the mobile device 220 with their respective corners 242, 244 in overlying alignment at the corner 226. In particular, the first and second cradles 250, 252 may be arranged such that corners of the power supply 210 and mobile device 220 are aligned at the corner 226 of the pocket 200. In some examples, the second cradle 252 may overly the first cradle 250. In such examples, the pocket 200 may include a fabric panel positioned between the first and second cradles 250, 252 to at least partially differentiate the first cradle 250 from the second cradle 252. In some examples, the fabric panel may be defined by the triangular panel 260 discussed above, and shown in FIG. 8.

Figure 5A:
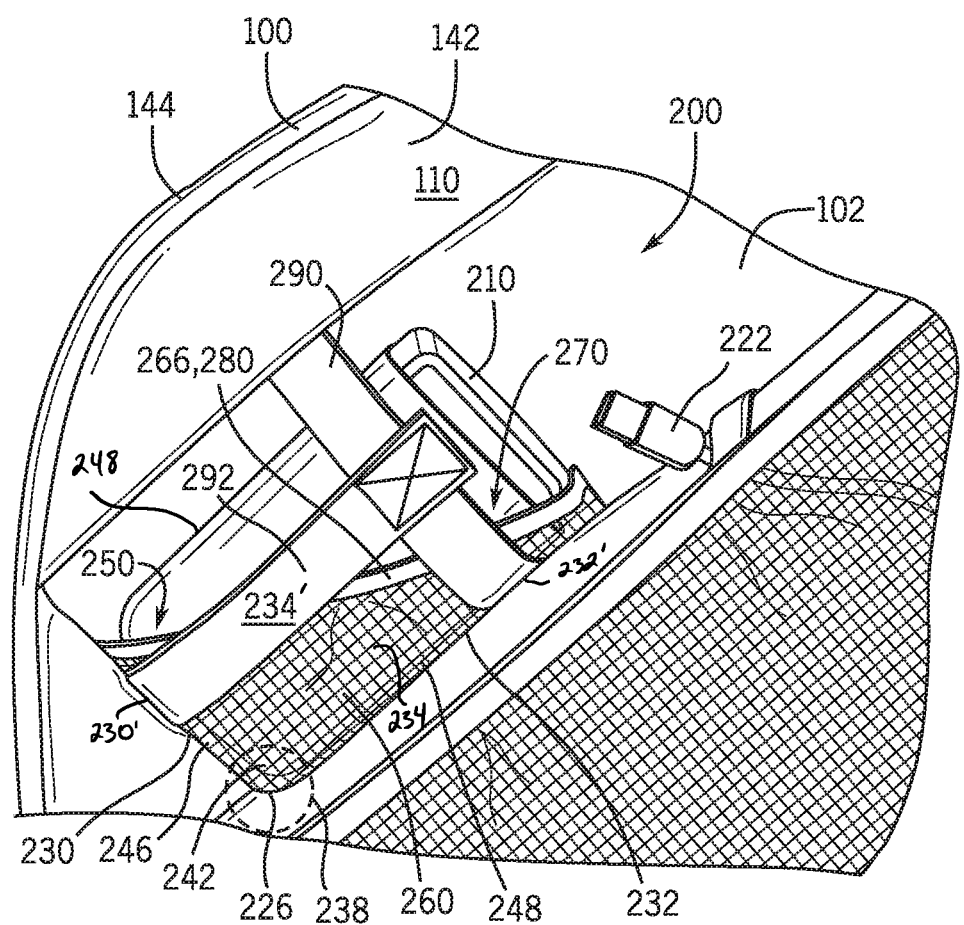
FIG. 5A illustrates a power supply or wireless power supply positioned within the angled pocket according to some examples of the present disclosure.
Figure 5B:
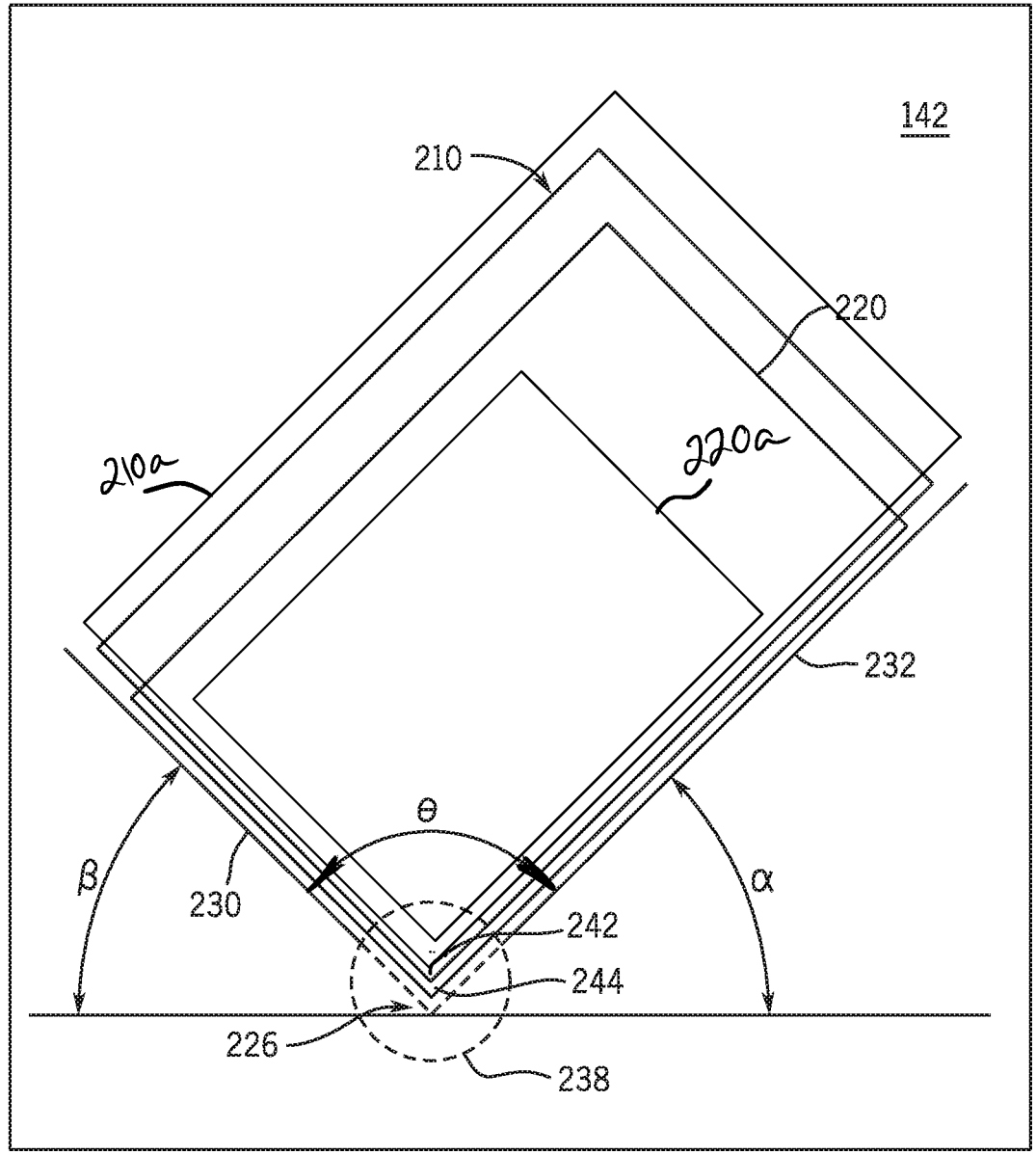
FIG. 5B illustrates the pocket holding various sizes of devices.
Figure 6:
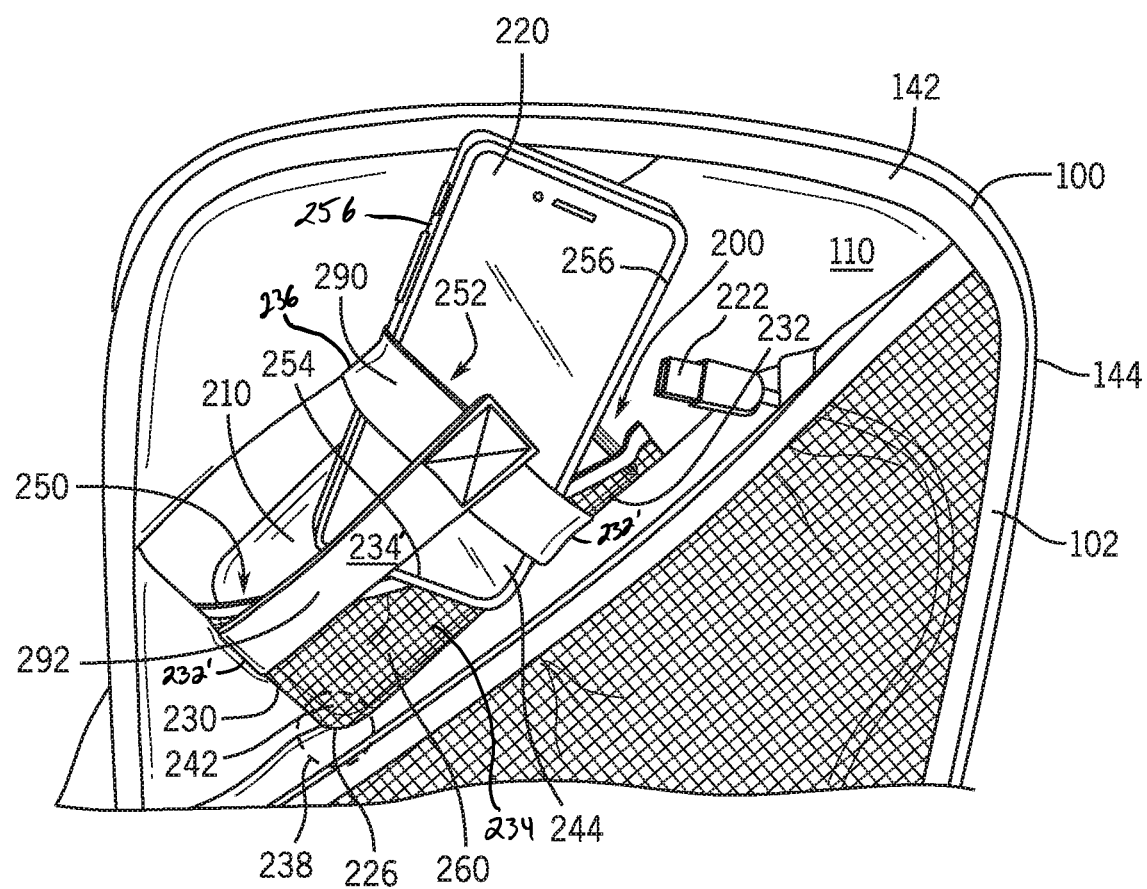
FIG. 6 illustrates a mobile device partly inserted within the angled pocket according to some examples of the present disclosure.
Figure 7:
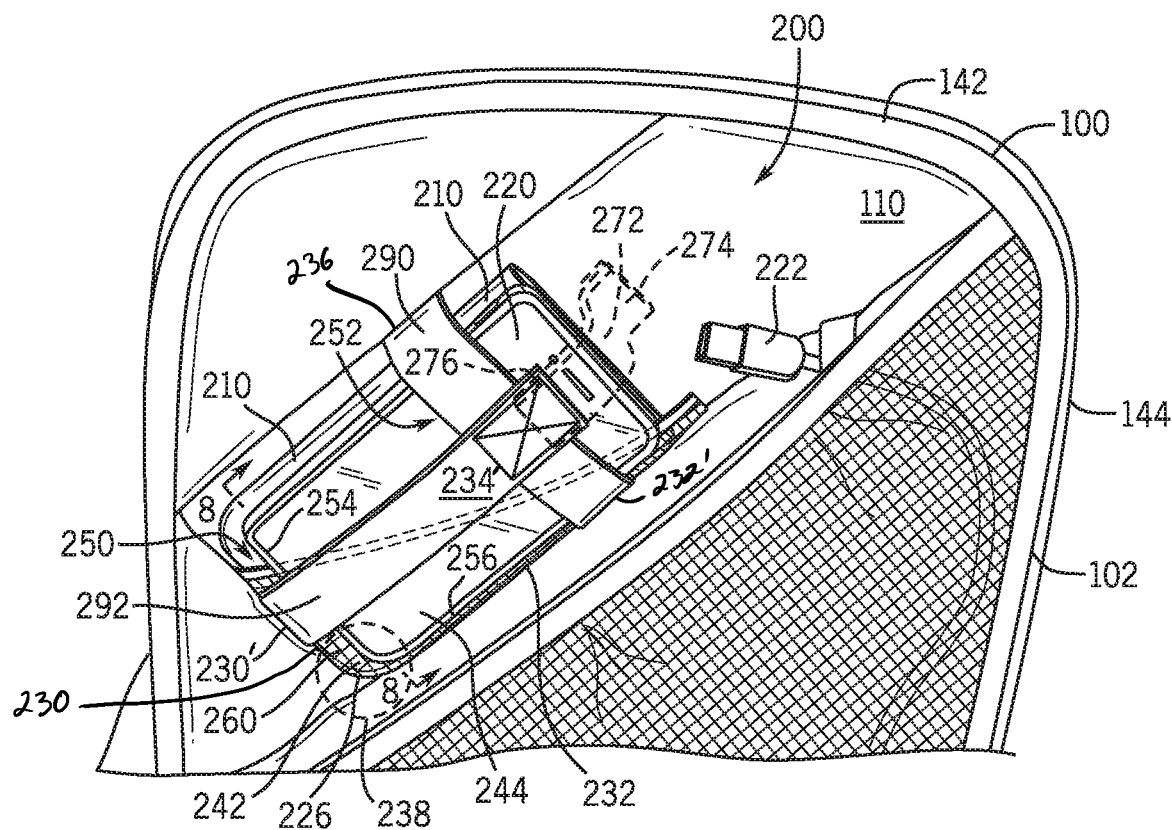
FIG. 7 illustrates the mobile device fully inserted within the angled pocket in overlying alignment with the power supply according to some examples of the present disclosure.

As shown in FIGS. 5A, 6, and 7, the power supply 210 and the mobile device 220 are shown being received into the pocket 200. In FIG. 5A, the power supply 210 is positioned in the first cradle 250. The power supply 210 is received in the pocket 200 between the cover panel 234, which in this example is fabric panel 260, and the panel 110 on which the pocket 200 is attached. The bottom edge 246 of the power supply is positioned adjacent to or engaging edge 230, and a side edge 248 is adjacent to or engaging edge 232, and the corner 242 is seated in lower corner 226 and located within the register position 238. The elastic webbing 288 may resiliently expand around the power supply 210 and provide a compressive force to help hold the power supply within the first cradle 250. In FIG. 6, the mobile device 220 is shown being inserted into the second cradle 252 of the pocket, with the power supply 210 already received in the first cradle 250. The mobile device 220 is positioned under the straps 290, 292, and over the cover panel 234 of the first cradle 250. The bottom edge 258 of the mobile device 220 is positioned adjacent to or engaging edge 230', and a side edge 268 adjacent to or engaging edge 232', and the corner 244 seated in lower corner 226 and located at the register position 238. In FIG. 7, the mobile device 220 is positioned in the second cradle 252, with a bottom edge 254 adjacent to or engaging edge 230', and a side edge 256 adjacent to or engaging edge 232', and the corner 244 seated in lower corner 226 and located within the register position 238. In this configuration, the power supply 210 and the mobile device 220 are received in the pocket, with the power supply in the first cradle 250 and the mobile device in the second cradle 252. Their respective corners 242 and 244 are aligned with one another. The respective corners 242 and 244 are also positioned in the lower corner and located in the register position 238.

Figure 8:
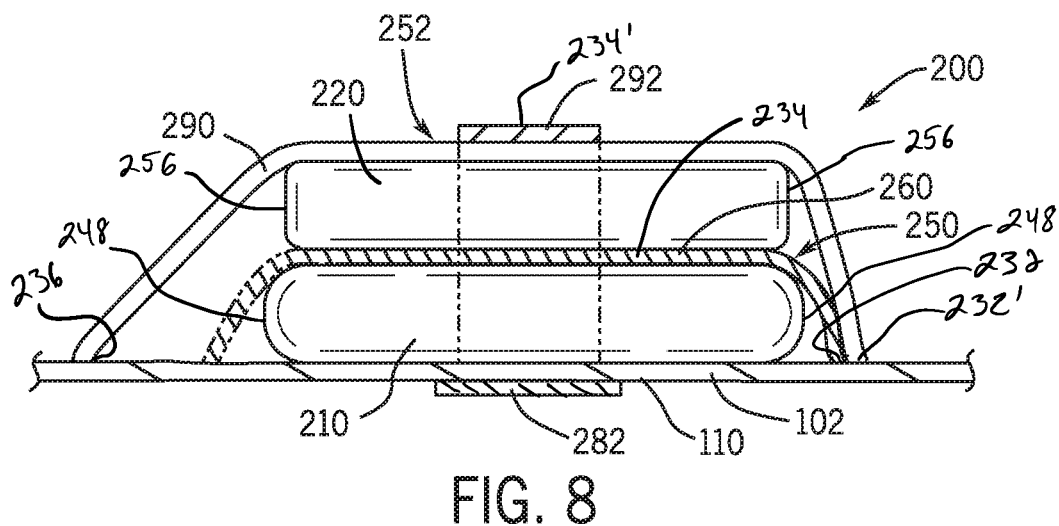
FIG. 8 is a cross-sectional view of FIG. 7 and showing the mobile device and power supply in overlying alignment within the angled pocket.

FIG. 8 shows that in the configuration in FIG. 7, the fabric 260 is positioned between the mobile device 220 and the power supply 210. The fabric 260 does not significantly affect with the wireless charging. FIG. 8 also shows the power supply 210 in a position adjacent to or in in engagement with the edge 232 of the first cradle 250. In this relative position, the edge 232 may act as a positioning feature, or guide, when the power supply 210 is inserted into the pocket. Given the dimensions of the pocket 200 and the relatively flexible material of the straps and cover (which generally conform around the devices), and specifically of the first cradle 250, the edge 248 of power supply 210 (in this example) may not contact or abut the edge 232, but since the edge 232 defines a portion of the peripheral boundary of the pocket 200, the power supply will move along the length of the edge 232 in the direction of the lower pocket 226 (see FIG. 7). Similarly with the mobile device 220 (in this example), it may not contact or abut the edge 232', but since the edge 232' defines a portion of the peripheral boundary of the pocket 200, the mobile device 220 will move (such as by being biased) along the length of the edge 232' in the direction of the lower pocket 226 (see FIG. 7). The corners 242, 244 of the power supply and mobile device will be then seated in the corner 226 and be at the register location 238. Regarding the edge 230 and 230', the position of the power supply 210 and the mobile device 220 in the first 250 and second 252 cradle, respectively, is very similar. The position of their bottom edges 246 and 254, respectively, adjacent to or in engagement with the edge 230 and 230', respectively, is very similar if not the same as shown in FIG. 8 and described immediately above. The edges 246 and 254 may not contact or abut the edge 230, but since the edge 230 defines a portion of the peripheral boundary of the pocket 200, the mobile device will move along the length of the edge 230 in the direction of the lower pocket 226 (see FIG. 7). Similarly with the mobile device 220 (in this example), it may not contact or abut the edge 230', but since the edge 230' defines a portion of the peripheral boundary of the pocket 200, the mobile device 220 will move (such as being biased) along the length of the edge 230' in the direction of the lower pocket 226 (see FIG. 7). The corners 242, 244 of the power supply and mobile device will be then seated in the corner 226 and be at the register location 238.

Figure 9:
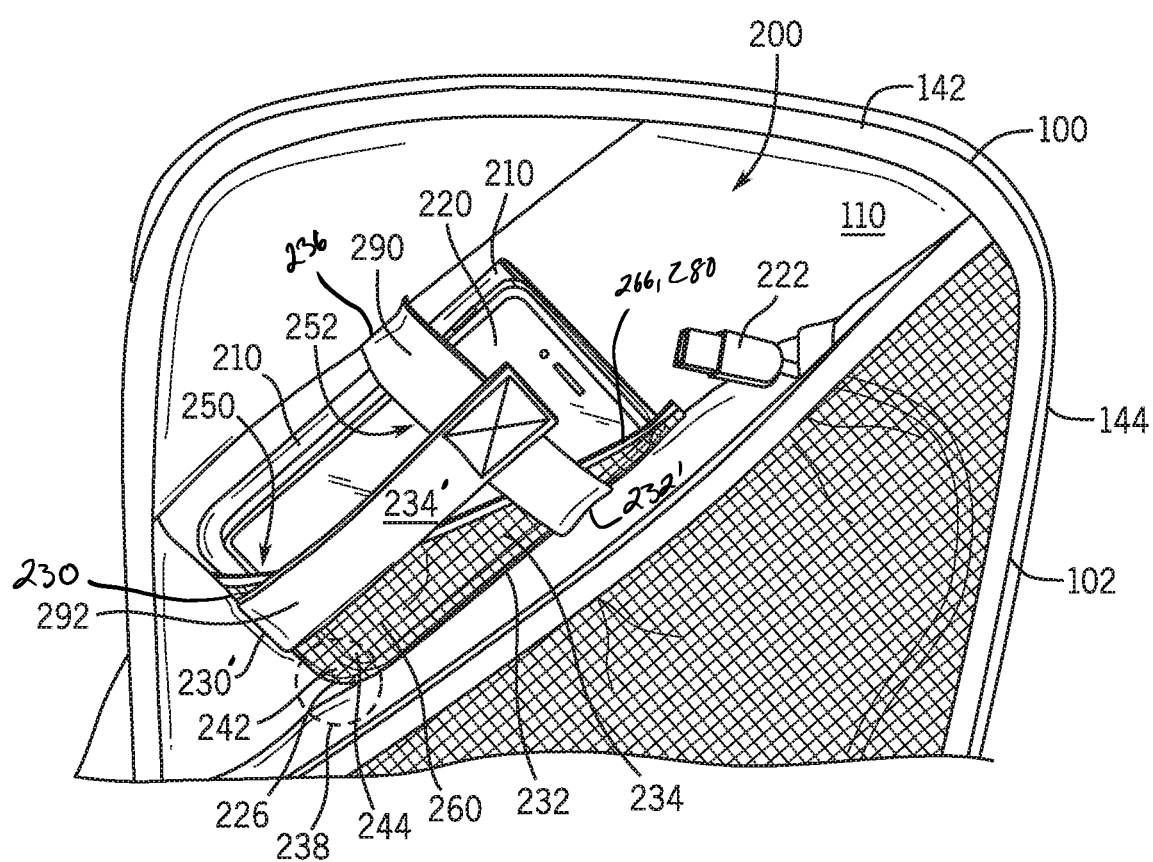
FIG. 9 illustrates the mobile device in overlying alignment with the power supply and within the same cradle or pocket according to some examples of the present disclosure.

As elsewhere described, the power supply 210 and the mobile device 220 may both be positioned in a single cradle, such as in the first cradle 250 or in the second cradle 252, in order to be relatively positioned together with the respective corners 242, 244 aligned to facilitate wireless charging. For example, as shown in FIG. 9, the pocket 200 includes a first cradle 250 and a second cradle 252. In this example, the power supply 210 and the mobile device 220 are both positioned in the first cradle 250 and overlying one another. The two units fit under the cover panel 234, such as in this example the panel 260, which helps hold the units in position. The lateral and bottom edges of each of the mobile device 220 and power supply 210 are each adjacent to or engaging the edges 230 and 232 respectively. The bottom corners 242, 244 of each of the power supply 210 and mobile device 220, respectively, are positioned in the lower corner 226 and aligned together. The corners 242, 244 are located in the register position 238 to facilitate wireless charging between the devices. The first cradle 250 maintains the proper orientation of the power supply 210 and mobile device 220 relative to one another while the luggage article 100 is moved. The second cradle is unused. The strap 290 and/or the strap 292 may provide supplemental assistance in holding the mobile device 220 and the power supply 210 in position, but are not necessary. Alternatively, both of the power supply 210 and the mobile device 220 may both be positioned in a single cradle, such as in the second cradle 252 in order to be relatively positioned together with the respective corners 242, 244 aligned to facilitate wireless charging.

The angle of the first and second edges 230, 232 of the pocket 200 may help automatically position and engage the power supply 210 and mobile device 220 in overlying alignment by corners of the power supply 210 and mobile device 220 being positioned together at the lower corner 226 of the pocket 200. For instance, the angle of the first and second edges 230, 232 may guide both the power supply 210 and the mobile device 220, when inserted into the pocket, towards the lower corner 226 to position the power supply 210 and mobile device 220 in overlying alignment at the lower corner 226. The power supply 210 and the mobile device 220 may be guided towards, such as in one example biased towards, the lower corner 226 under gravity and/or under the tension created by the elastic straps. In this manner, the power supply 210 and mobile device 220 may be biased towards overlying alignment at the lower corner 226 to align corners of each of the power supply 210 and mobile device 220 at the lower corner 226. The power supply 210 and the mobile device 220 may remain in this alignment during use of the luggage case because they are seated in the corner 226, and guided there by the edges 230, 232 and corner 226. This seating effect is a benefit of each of the different cradles 250, 252. When corners of the power supply 210 and mobile device 220 are aligned at the lower corner 226 of the pocket 200, the power supply 210 and mobile device 220 may extend parallel to each other. Alternatively, the power supply 210 and the mobile device 220 may be guided towards the lower corner 226 by the edges 230, 232 under the insertion force created by the user, and held in that orientation by the structure of the pocket. In this manner, the power supply 210 and mobile device 220 may be positioned in overlying alignment at the lower corner 226 to align corners of each of the power supply 210 and mobile device 220 at the lower corner 226. In either case, the corners of each of the power supply 210 and mobile device 220 are then in the register position 238 when seated in the lower corner 226.

The angle of the first and second edges 230, 232 of the pocket 200 may facilitate the stable positioning of the mobile device 220, power unit 210, or both, with their respective corners 244, 242 seated in the lower corner 226 and located in the register position 238. For instance, the angle of the pocket 200 may limit relative sliding or other relative movement between the mobile device 220 and the power supply 210. In this manner, the angled pocket 200 limits misalignment of the power supply 210 and mobile device 220 within the pocket 200, which misalignment would limit wireless charging of the mobile device 220 to shut off or be less effective. Without an angled pocket structure to help maintain alignment of the corners, the wireless charging may be intermittent, inefficient, or stop completely.

The pocket 200 may be angled in many configurations to guide the power supply 210 and mobile device 220 to the lower corner 226. Referring to FIG. 5B, the first and second edges 230, 232 may extend at an angle Theta relative to each other, and edge 230 may extend at an angle Beta to horizontal, and edge 232 may extend at an angle Alpha to horizontal. In any event, Alpha plus Beta plus Theta may equal 180 degrees. In one example, the angle Theta is approximately 90 degrees. In this example, the first edge 230 may be at an angle Beta of around 45 degrees relative to horizontal, and the second edge 232 may be at an angle Alpha of around 45 degrees relative to the horizontal. Horizontal is defined as when the luggage article 100 is in an upright position, such as in FIG. 1. In another example, with Theta at about 90 degrees, the edge 230 may be at an angle Beta between about 25 degrees and about 70 degrees to horizontal, and in another example be about 60 degrees to horizontal. In another example, with Theta at about 90 degrees, angle Alpha may be between about 25 degrees and about 70 degrees to horizontal, and in another example may be about 60 degrees to horizontal. In another example, angle Theta may be greater than 90 degrees or less than 90 degrees. If Theta is greater than 90 degrees, the corners 242, 244 may still become seated in the lower corner 226, but would not be maintained in as stable of a position by virtue of the edges 230 and 232. Where Theta is less than 90 degrees, the corners 242, 244 may not be seat in lower corner 226, but may still be sufficiently positioned near the register position to facilitate wireless charging. In another example, the first and second edges 230, 232 of the pocket 200 may extend at an angle between about 25 degrees and about 70 degrees to horizontal. In one example, at least one of the first and second edges 230, 232 may be angled around 45 degrees relative to horizontal. In another example, at least one of the first and second edges 230, 232 may be angled around 60 degrees relative to horizontal.

The edges 230, 230', 232, 232' may each extend in a linear direction, or may be curved or a combination of both. These edges may also be continuous, discontinuous, or segmented. While shown as being linear with respect to the disclosure of the angles of the pocket in FIG. 5B, where the edges are not linear, the angle relative to horizontal of a particular edge that is not a simple line (for example a curved edge) may still be determined or effectively approximated by taking the general direction of the respective edge from the corner 226 to a terminal end of the pocket along that edge.

An optional strap 272 shown in dash in FIG. 7, may be used to help retain the mobile device 220 and/or the power supply 210 within the pocket 200. The strap 272, in one example, may define opposing ends, with one end 274 connected to the panel 110 on which the pocket 200 is positioned. An opposing end 276 may be releasably secured to the cover panel 234, including in one example panel 260. Alternatively, the end 274 may be releasably connected to the panel 110, and fixedly connected to the cover panel 234. In still another example, the strap 272 may be releasably connected at both ends 274 and 276. The strap 272 may extend over at least one of the cradles 250, 252. As is shown in FIG. 7, the strap 272 extends over both the first cradle 250 and the second cradle 252. The strap 272, in one example, forms the $4^{th}$ edge of the second cradle 252 to contain the mobile device 220 and/or power supply 210 within the second cradle.

The luggage article 100 may be formed from a variety of materials and means. For example, the housing 102, among others, may be formed from a thermoplastic material (self-reinforced or fiber reinforced), ABS, polycarbonate, polypropylene, polystyrene, PVC, polyamide, and/or PTFE, among others. In some examples, portions of the luggage article 100 may be extruded from aluminum or other similar metal. In addition, the housing 102 may be formed from fiber reinforced epoxy, resin, or other similar material. The luggage article 100 may be formed or molded in any suitable manner, such as by plug molding, blow molding, injection molding, extrusion, casting, or the like. As noted above, the luggage article 100 may be formed from soft side material and/or hard side material. Exemplary materials are noted above.

All relative and directional references (including: upper, lower, upward, downward, left, right, leftward, rightward, top, bottom, side, above, below, front, middle, back, vertical, horizontal, and so forth) are given by way of example to aid the reader's understanding of the particular examples described herein. They should not be read to be requirements or limitations, particularly as to the position, orientation, or use unless specifically set forth in the claims. Connection references (e.g., attached, coupled, connected, joined, and the like) are to be construed broadly and may include intermediate members between a connection of elements and relative movement between elements. As such, connection references do not necessarily infer that two elements are directly connected and in fixed relation to each other, unless specifically set forth in the claims.

Those skilled in the art will appreciate that the presently disclosed examples teach by way of example and not by limitation. Therefore, the matter contained in the above description or shown in the accompanying drawings should be interpreted as illustrative and not in a limiting sense. The following claims are intended to cover all generic and specific features described herein, as well as all statements of the scope of the present method and system, which, as a matter of language, might be said to fall there between.

The invention claimed is:

1. A luggage article having a pocket for receiving at least a portion of a power supply and a mobile device, the luggage article comprising:
    a panel; and
    the pocket attached to and positioned at a non-zero angle relative to the panel, the pocket including a first cradle arranged to receive and secure at least portions of a power supply, and a second cradle arranged to receive and secure at least portions of a mobile device, the first and second cradles of the pocket aligned at a lower corner of the pocket and arranged such that the power supply and the mobile device are held and engaged in overlying alignment at the lower corner of the pocket, wherein the pocket includes at least two edges extending from the lower corner of the pocket at a non-zero angle relative to adjacent peripheral edges of the luggage article when the luggage article is in an upright position.

2. The luggage article of claim 1, wherein:
    the panel at least partially defines an internal storage compartment of the luggage article; and
    the pocket is defined within the internal storage compartment.

3. The luggage article of claim 1, wherein the two edges of the pocket extend from the lower corner of the pocket at an angle T relative to each other, a first edge of the at least two edges extends at an angle B to horizontal and a second edge of the at least two edges extends at an angle A to horizontal and angle A, B and T together are 180 degrees, and angles A, B and T are individually greater than zero degrees and less than 180 degrees.

4. The luggage article of claim 1, wherein the first and/or second cradle of the pocket includes three edges, including a bottom edge and a first lateral edge extending from the lower corner at an angle, and a second lateral edge extending from the bottom edge spaced apart from the first lateral edge.

5. The luggage article of claim 1, wherein the angle of the two edges of each of the first and/or second cradles guides both the respective power supply and/or the mobile device towards the lower corner to position the power supply and the mobile device into an overlying alignment at the lower corner.

6. The luggage article of claim 1, wherein at least the first cradle in part defines a triangular panel with two sides attached along at least portions of the two edges of the respective cradle.

7. The luggage article of claim 1, wherein at least one of the first or second cradle is defined at least in part by one or more straps attached to the panel.

8. The luggage article of claim 1, wherein:
    the power supply includes an electrical connector,
    an electrical wire having opposing ends, one of the ends for connecting to the power supply and the other of the ends for connecting to a mobile device or to at least one electrical connector positioned on the exterior of the luggage article.

9. A luggage article having a pocket for receiving at least a portion of a power supply and a mobile device, the luggage article comprising:
    a plurality of panels defining an internal storage compartment; and
    the pocket defined within the internal storage compartment and attached to one of the plurality of panels, the pocket arranged to receive and secure at least portions of a power supply and a mobile device therein, the pocket including two edges arranged at an angle to both vertical and horizontal when the luggage article is in an upright position to define a lower corner and the pocket is positioned at an angle relative to the panel and to adjacent peripheral edges of the luggage article when the luggage article is in an upright position;
    wherein the pocket is arranged such that the power supply with wireless charging capabilities and the mobile device are positioned and aligned in at least partial overlying alignment at the lower corner to facilitate wireless charging;
    wherein the angle of one of the edges of the pocket relative to a respective peripheral edge of the luggage article is greater than zero degrees and less than 180 degrees.

10. The luggage article of claim 9, wherein the power supply and mobile device are biased towards overlying alignment at the lower corner to align corners of each of the power supply and mobile device at the lower corner.

11. The luggage article of claim 9, wherein the pocket comprises one or more cradles to receive and secure at least portions of the power supply and the mobile device.

12. The luggage article of claim 9, wherein the pocket comprises a first cradle and a second cradle overlying the first cradle, the first cradle arranged to receive and secure at least portions of one of the power supply and the mobile device, the second cradle arranged to receive and secure at least portions of the other of the power supply and mobile device.

13. The luggage article of claim 12, further comprising a fabric panel positioned between the first and second cradles to at least partially define each of the first and second cradles.

14. The luggage article of claim 13, wherein the fabric panel forms a triangular panel, with two of the three sides respectively attached to the two adjacent edges of the pocket.

15. The luggage article of claim 10, wherein at least portions of the power supply and the mobile device are received within a single cradle.

16. The luggage article of claim 10, wherein the two adjacent edges are structurally joined at the lower corner by a physical connection or are not structurally joined at the lower corner and a gap is formed.

17. A luggage article having a pocket for receiving at least a portion of a power supply and a mobile device, the luggage article comprising:
- a housing defined by a plurality of panels; and
- the pocket defined on a surface of and at an angle relative to one of the plurality of panels and relative to adjacent peripheral edges of the luggage article to secure at least portions of a power supply and a mobile device therein, the pocket including a lower corner and two adjacent edges extending at an angle to both vertical and horizontal when the luggage article is in an upright position,
- wherein the angle of the two adjacent edges guides both the power supply and mobile device towards the lower corner to position the power supply and mobile device in overlying alignment at the lower corner;
- wherein the angle of one of the adjacent edges of the pocket relative to a respective peripheral edge of the luggage article is greater than zero degrees and less than 180 degrees.

18. The luggage article of claim 17, wherein the two edges extend at an angle between 25 degrees and 70 degrees to horizontal when the luggage article is in an upright position.

19. The luggage article of claim 17, wherein the power supply and the mobile device are held and engaged in overlying alignment at the lower corner.

20. The luggage article of claim 17, wherein the two edges are spaced apart at the lower corner such that the lower corner is defined only by extrapolation of the edges.

* * * * *